(12) United States Patent
Okada

(10) Patent No.: US 6,433,459 B1
(45) Date of Patent: Aug. 13, 2002

(54) PIEZOELECTRIC ACTUATOR

(75) Inventor: Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/671,228

(22) Filed: Sep. 27, 2000

(30) Foreign Application Priority Data

Sep. 30, 1999 (JP) .......................................... 11-280180

(51) Int. Cl.[7] .............................................. H01L 41/08
(52) U.S. Cl. ................................... 310/317; 310/316.03
(58) Field of Search ............................ 310/323.02, 328, 310/316.02, 316.03

(56) References Cited

U.S. PATENT DOCUMENTS

| | | | |
|---|---|---|---|
| 4,195,243 A | * | 3/1980 | Thaxter ...................... 310/317 |
| 4,595,854 A | * | 6/1986 | Yano et al. .................. 310/317 |
| 5,589,723 A | | 12/1996 | Yoshida et al. ............. 310/328 |
| 5,768,016 A | | 6/1998 | Kanbara ...................... 359/557 |
| 5,786,654 A | | 7/1998 | Yoshida et al. ............. 310/328 |
| 5,907,212 A | * | 5/1999 | Okada ......................... 310/328 |
| 5,969,464 A | | 10/1999 | Nakano et al. ............. 310/328 |

* cited by examiner

*Primary Examiner*—Mark O. Budd
(74) *Attorney, Agent, or Firm*—Sidley Austin Brown & Wood LLP

(57) ABSTRACT

In an impact type piezoelectric actuator, a driven member is movably coupled with a driving member by a friction force and the driving member is reciprocally moved by expansion and contraction of a piezoelectric device. The piezoelectric actuator is expanded and contracted by charge and discharge of electric charge thereto. A driving controller controls to vary the charging time period and the discharging time period for changing the expansion speed and the contraction speed of the piezoelectric device, so that the driven member can be moved relative to the driving member.

20 Claims, 25 Drawing Sheets

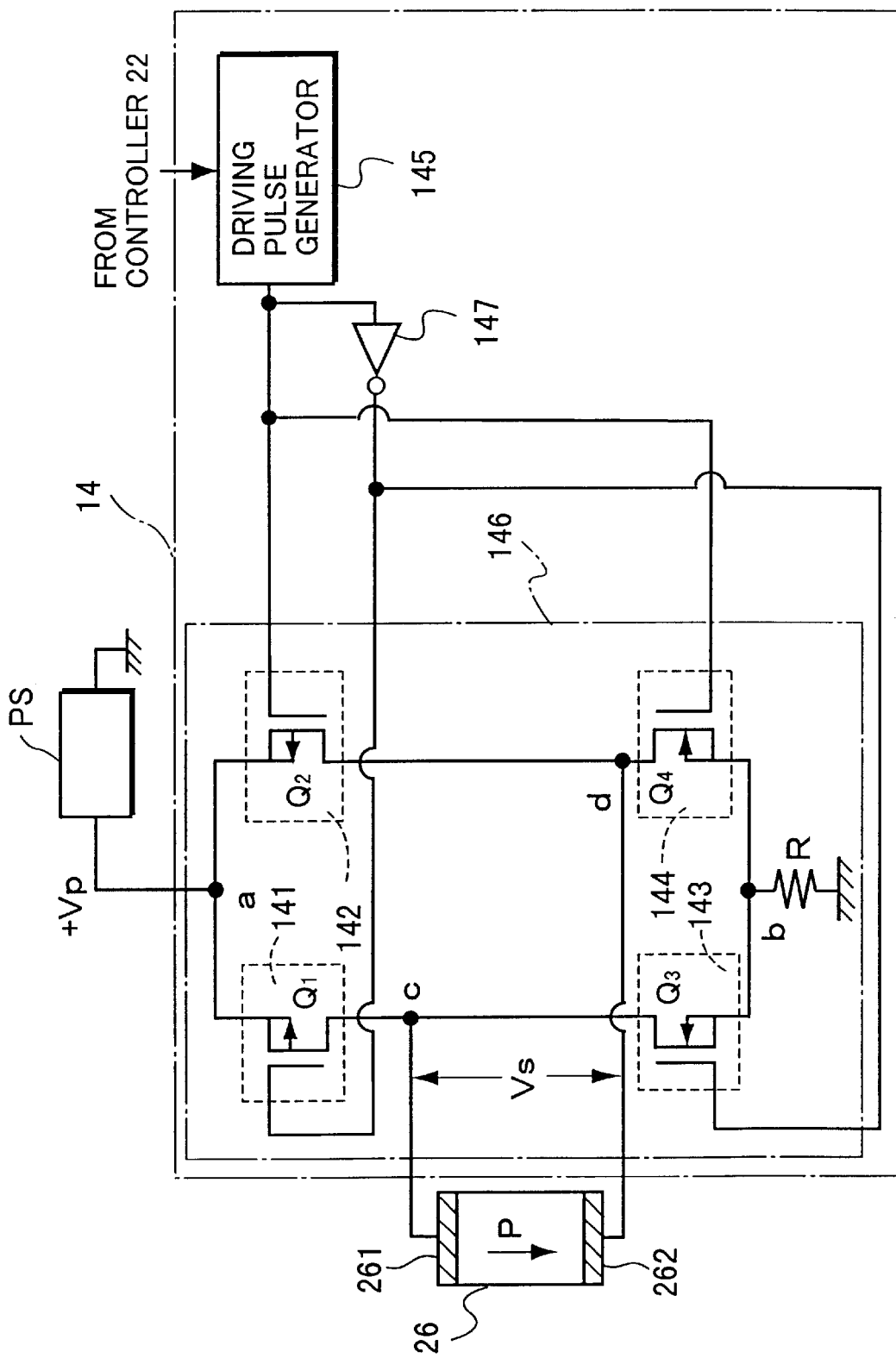

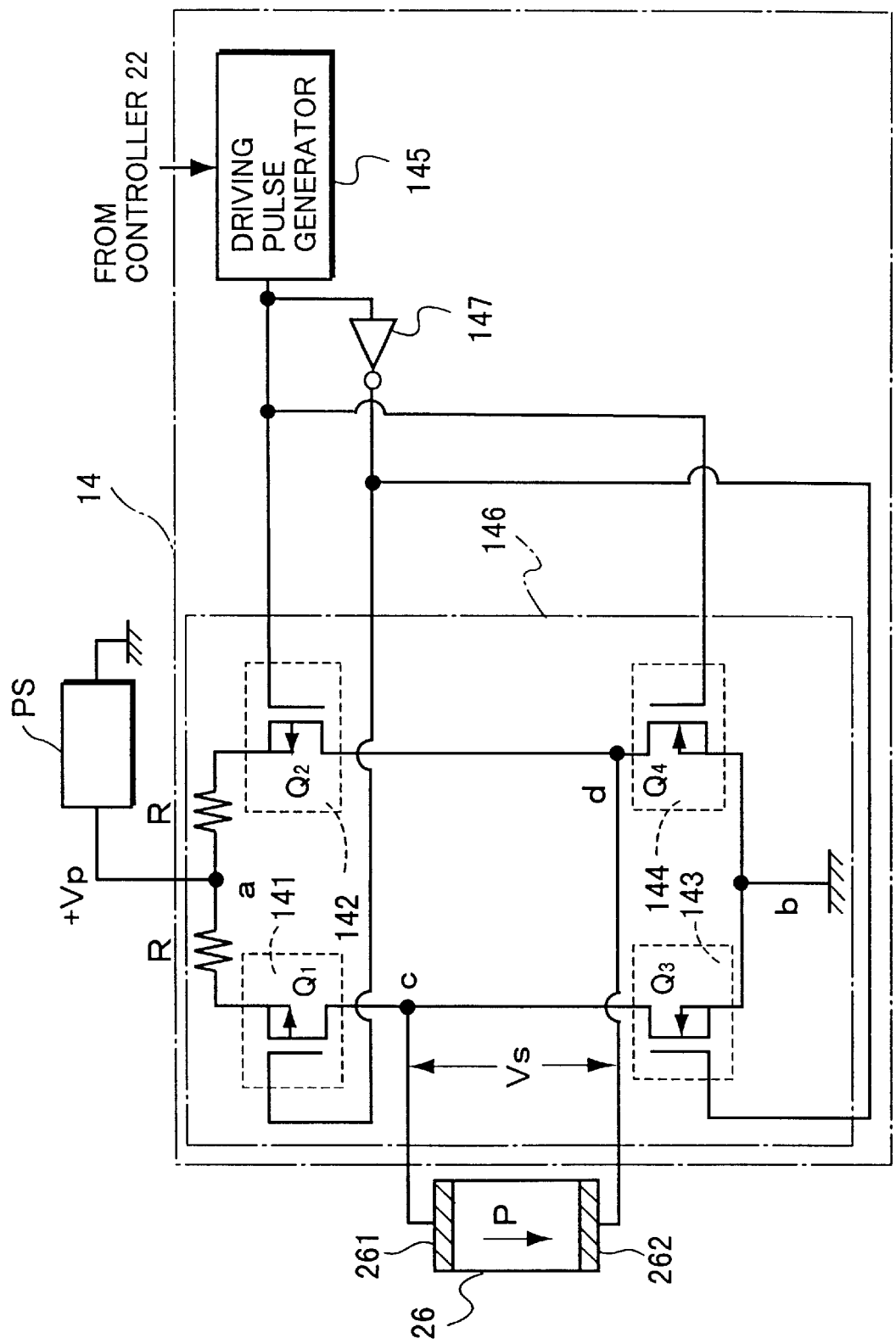

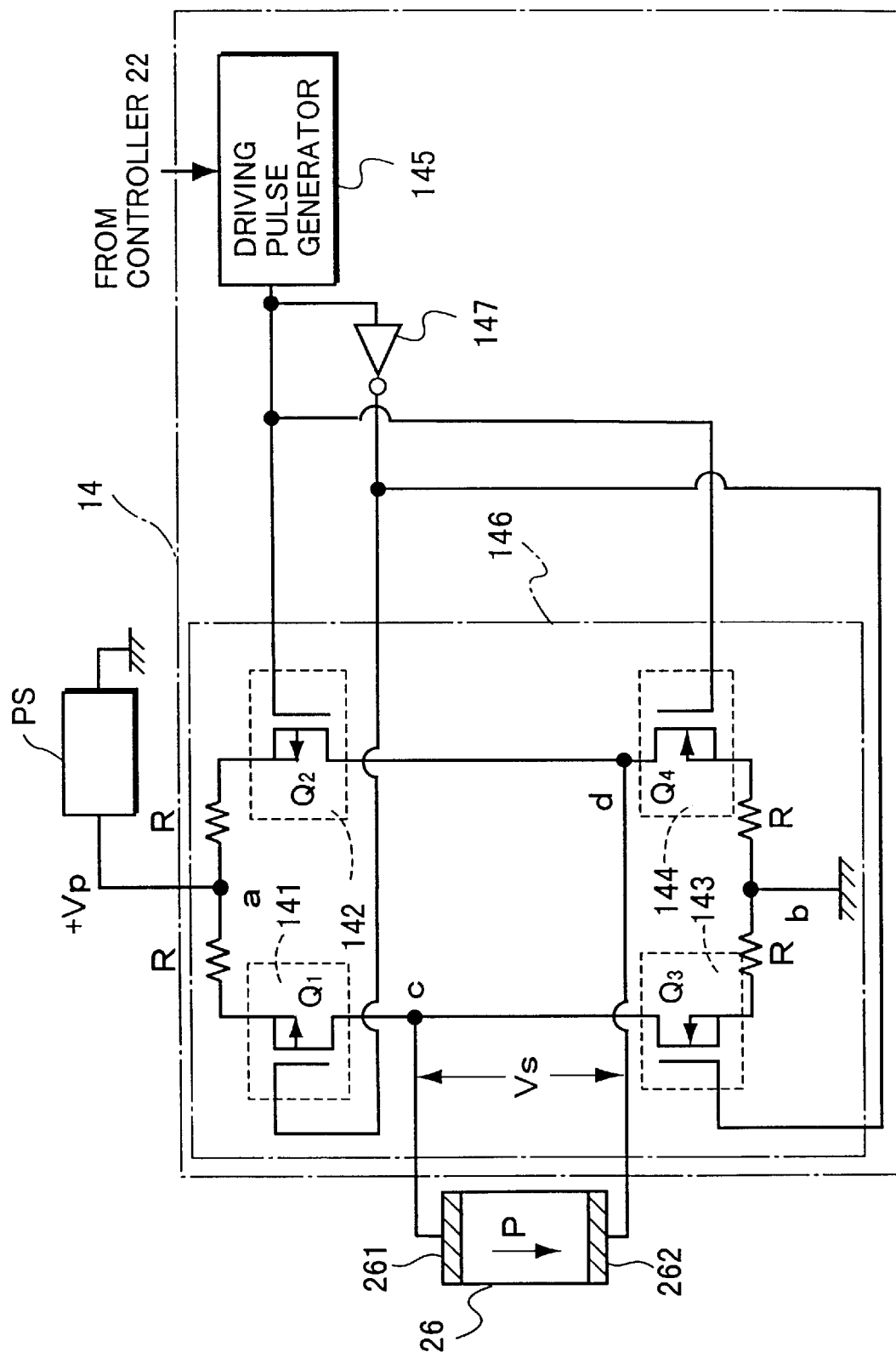

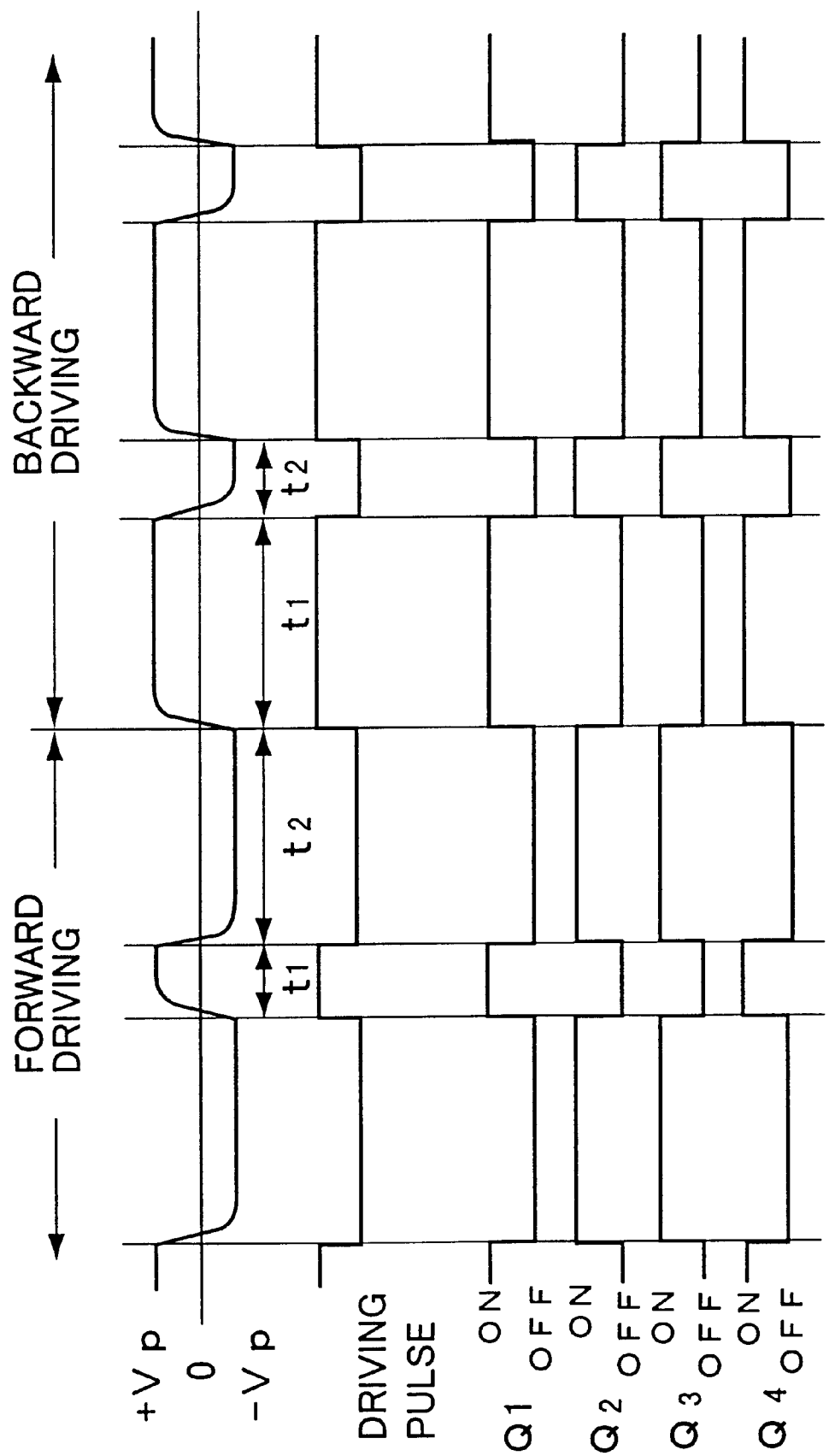

US 6,433,459 B1

PIEZOELECTRIC ACTUATOR

This application is based on patent application Hei. 11-280180 filed in Japan, the contents of which are hereby incorporated by reference.

BACKGROUND OF THE INVENTION

1. Field of the Invention

This invention relates to a piezoelectric actuator suitable for moving a driven member such as a two-dimensional moving table, a taking lens of a camera, a projection lens of an over-head projector, a lens of a binocular, and so on.

2. Description of the Related Art

In an impact type piezoelectric actuator, a driven member is movably coupled with a rod shaped driving member in an axial direction thereof. An end of the driving member is fixed on an end of a piezoelectric device in a manner so that the polarization of the piezoelectric device coincides with the axial direction of the driving member. For example, U.S. Pat. No. 5,589,723 shows a conventional impact type piezoelectric actuator used for moving a taking lens of a camera.

A basic configuration of the conventional impact type piezoelectric actuator is shown in FIG. 20. The piezoelectric actuator 100 comprises a rod shaped driving member 101, a driven member 102, a lamination type piezoelectric device 103 and a driving circuit 104. The driven member 102 is coupled with the driving member 101 by a predetermined friction force. When a dynamic force larger than the friction force is applied to the driven member 102, it can be moved in an axial direction relative to the driving member 101. An object to be moved such as a taking lens is connected to the driven member 102. The piezoelectric device 103 is connected on a base end 101b of the driving member 101 in a manner so that the polarization of the piezoelectric device 103 coincides with the axial direction of the driving member 101. A pair of electrodes 103a and 103b are provided on both ends of the piezoelectric device 103. The first electrode 103a is connected to the driving circuit 104 and the second electrode 103b is grounded.

The driving circuit 104 is configured by a forward driving circuit 105 for moving the driven member 102 toward a top end 101a of the driving member 101 (hereinafter, this direction is called "forward"), a backward driving circuit 106 for moving the driven member 102 toward the base end 101b of the driving member 101 (hereinafter, this direction is called "backward") and a controller 107 for controlling the forward driving circuit 105 and the backward driving controller 106, alternatively.

The piezoelectric actuator 100 moves the driven member 102 relative to the driving member 101 by utilizing a difference of friction forces acting between the driving member 101 and the driven member 102 corresponding to the moving speed of the driving member 101. When the driving member 101 moves quickly, the friction force becomes smaller. Alternatively, when the driving member 101 moves slowly, the friction force becomes larger. For moving the driven member 102 forward, the driving member is slowly moved forward and quickly moved backward (forward driving). For moving the driven member 102 backward, the driving member is quickly moved forward and slowly moved backward (backward driving).

The forward driving circuit 105 is configured by a slow charger 105a and a quick discharger 105b. The backward driving circuit 106 is configured by a quick charger 106a and a slow discharger 106b. The slow charger 105a and the quick charger 106a respectively apply a driving voltage Vp to the piezoelectric device 103 in the polarization direction (or charge the piezoelectric device 103 in the polarization direction) for expanding the piezoelectric device 103 in the polarization direction (or in the axial direction of the driving device 101). The quick discharger 105b and the slow discharger 106b respectively apply a voltage to the piezoelectric device 103 in the opposite direction to the polarization (or discharges the electric charge in the piezoelectric device 103 by grounding the electrode 103a) for contracting the piezoelectric device 103.

A configuration of the slow charger 105a is shown in FIG. 21. As can be seen from FIG. 21, the slow charger 105a is configured by a constant current charging circuit, in which a zener diode ZD is connected in parallel with a fixed biasing circuit of a pnp type transistor Tr1. Resistors r1 and r2 serve as biasing resistors of the transistor Tr1. The zener diode ZD is connected in parallel with the resistor r2. Since the zener diode ZD restricts the base current of the transistor Tr1 at a predetermined constant value, voltage drop owing to the resistor r1 can be maintained at a predetermined value. The collector current of the transistor Tr1 can be restricted to be constant. As a result, the charging current for charging the piezoelectric device 103 is restricted, so that the forward moving speed of the driving member 101 is restricted.

Alternatively, another configuration shown in FIG. 22 is used as the slow charger 105a. As can be seen from FIG. 22, an npn transistor Tr2 is used instead of the parallel circuit of the resistor r2 and the zener diode ZD. The collector and the base of the transistor Tr2 are respectively connected to the emitter and the base of the transistor Tr1. The emitter of the transistor Tr2 is connected to an electric power supply and the driving voltage Vp is applied thereto. Since the voltage at the base of the transistor Tr1 is maintained at a constant value by the transistor Tr2, voltage drop owing to the resistor r1 can be maintained at a predetermined value. The collector current of the transistor Tr1 can be restricted to be constant.

The quick discharger 105b and the slow discharger 106b apply a voltage to the piezoelectric device 103 in a direction opposite to the polarization of the piezoelectric device 103, so that the electric charge stored in the piezoelectric device 103 is discharged. Thus, the expanded piezoelectric device 103 is contracted. In FIG. 20, the electric charge in the piezoelectric device 103 is discharged by grounding the electrode 103a.

A configuration of the slow discharger 106b is shown in FIG. 23. As can be seen from FIG. 23, the slow discharger 106b is configured by a constant current discharging circuit, in which a zener diode ZD is connected between the base of an npn type transistor Tr3 and the ground. A resistor r4 restricts the discharging current. Since the zener diode ZD restricts the base voltage of the transistor Tr3 at a predetermined constant value, voltage drop owing to the resistor r4 can be maintained at a predetermined value. The emitter current corresponding to the discharging current flowing in the resistor r4 can be restricted to be a predetermined value. As a result, the discharging current for discharging the piezoelectric device 103 is restricted, so that the backward moving speed of the driving member 101 is restricted.

The controller 107 alternately switches the slow charger 105a and the quick discharger 105b in the forward driving operation. The controller 107 alternately switches the quick charger 106a and the slow discharger 106b in the backward driving operation.

When the slow charger 105a and the quick discharger 105b are alternately driven in the forward driving operation, the piezoelectric device 103 repeats the slow expansion and the quick contraction, alternately. By such operation, the driving member 101 repeats the forward slow movement and the backward quick movement. When the quick charger 106a and the slow discharger 106b are alternately driven in the backward driving operation, the piezoelectric device 103 repeats the quick expansion and the slow contraction, alternately. By such operation, the driving member 101 repeats the forward quick movement and the backward slow movement.

The impact type piezoelectric actuator is generally used for driving an optical system of a portable equipment such as a taking lens of a camera and a lens of a binocular. It is preferable to make the driving circuit of the actuator compact and simple with regard to the downsizing and the lightening of the equipment.

In the above-mentioned conventional piezoelectric actuator, the charging current and the discharging current are restricted by the constant current circuits, so that a number of elements constituting the circuit inevitably increases. It becomes difficult to make the configuration and size of the driving circuit simple and small.

Furthermore, in the conventional piezoelectric actuator 100, it is necessary to change the circuit constant of circuit elements constituting the constant current circuit for varying the moving speed of the driven member 102. In this case, a plurality of circuit elements and switching circuits having the different circuit constants are necessary, so that the downsizing of the driving circuit 104 becomes more difficult.

On the other hand, U.S. Pat. No. 5,969,464 shows an actuator having a plurality of piezoelectric devices respectively having different driving characteristics. For varying the moving speed of the driven member, one of the piezoelectric devices is selectively driven for moving the driven member at a different moving speed. This actuator, however, has a disadvantage that the downsizing of the actuator becomes difficult because the driving circuit becomes complex and the piezoelectric devices occupy the space. U.S. Pat. No. 5,768,016 shows another actuator in which pulses of the driving signal are thinned for varying the moving speed of the driven member. This actuator has a disadvantage that the moving speed of the driven member becomes unstable.

SUMMARY OF THE INVENTION

An object of this invention is to provide an impact type piezoelectric actuator by which a moving speed of a driven member can smoothly be varied and an apparatus using the piezoelectric actuator can be downsized.

A piezoelectric actuator in accordance with an aspect of this invention comprises a piezoelectric device, a driving member driven by the expansion and contraction of the piezoelectric device, a holder for holding the piezoelectric device and the driving member, a driven member coupled with the driving member by a friction force and movable along the axial direction of the driving member, and a driving apparatus (or driving circuit) for applying driving voltage to the piezoelectric device. An end of the driving member is fixed on an end of the piezoelectric device in polarization direction of the piezoelectric device.

The driving apparatus or the driving circuit comprises a first driver for charging and/or discharging the piezoelectric device, a second driver for charging and/or discharging the piezoelectric device substantially the same charging and discharging speed as those of the first driver, and a controller for modifying at least one of a first driving time period of the first driver and a second driving time period of the second driver for varying the moving speed of the driven member or for changing the moving direction of the driven member.

By such a configuration, since the charging speed for charging the piezoelectric device can substantially be the same as the discharging speed thereof, it is possible to provide a relatively large difference between an expansion speed of the piezoelectric device and a contraction speed thereof by modifying the first driving time period of the first driver and the second driving time period of the second driver. When the moving speed of the driving member owing to the expansion or contraction of the piezoelectric device is sufficiently faster, the dynamic force acting on the driving member becomes larger than the friction force acting between the driving member and the driven member, so that the driven member can be moved relative to the driving member.

Furthermore, since the driving apparatus or the driving circuit modifies the charging time period and/or discharging time period of the piezoelectric device, the driving apparatus or the driving circuit needs no constant current circuit used in the conventional piezoelectric actuator. Thus, the configuration of the driving apparatus or the driving circuit of the piezoelectric actuator can be made simple and small.

Still furthermore, since the driving speed of the driven member can be controlled by modifying at least one of the first driving time period of the first driver and the second driving time period of the second driver, the moving speed of the driven member can be varied smoothly.

BRIEF DESCRIPTION OF THE DRAWINGS

FIGS. 14A to 14F are circuit diagrams for showing modifications of the driving circuit in the embodiment;

FIG. 15 is a timing chart for showing waveforms of a driving voltage applied to the piezoelectric device, the driving pulses and ON and OFF of switching elements Q1 to Q4 in the modified driving circuit, for example, shown in FIG. 14A;

DETAILED DESCRIPTION OF THE EMBODIMENT

Figure 1:
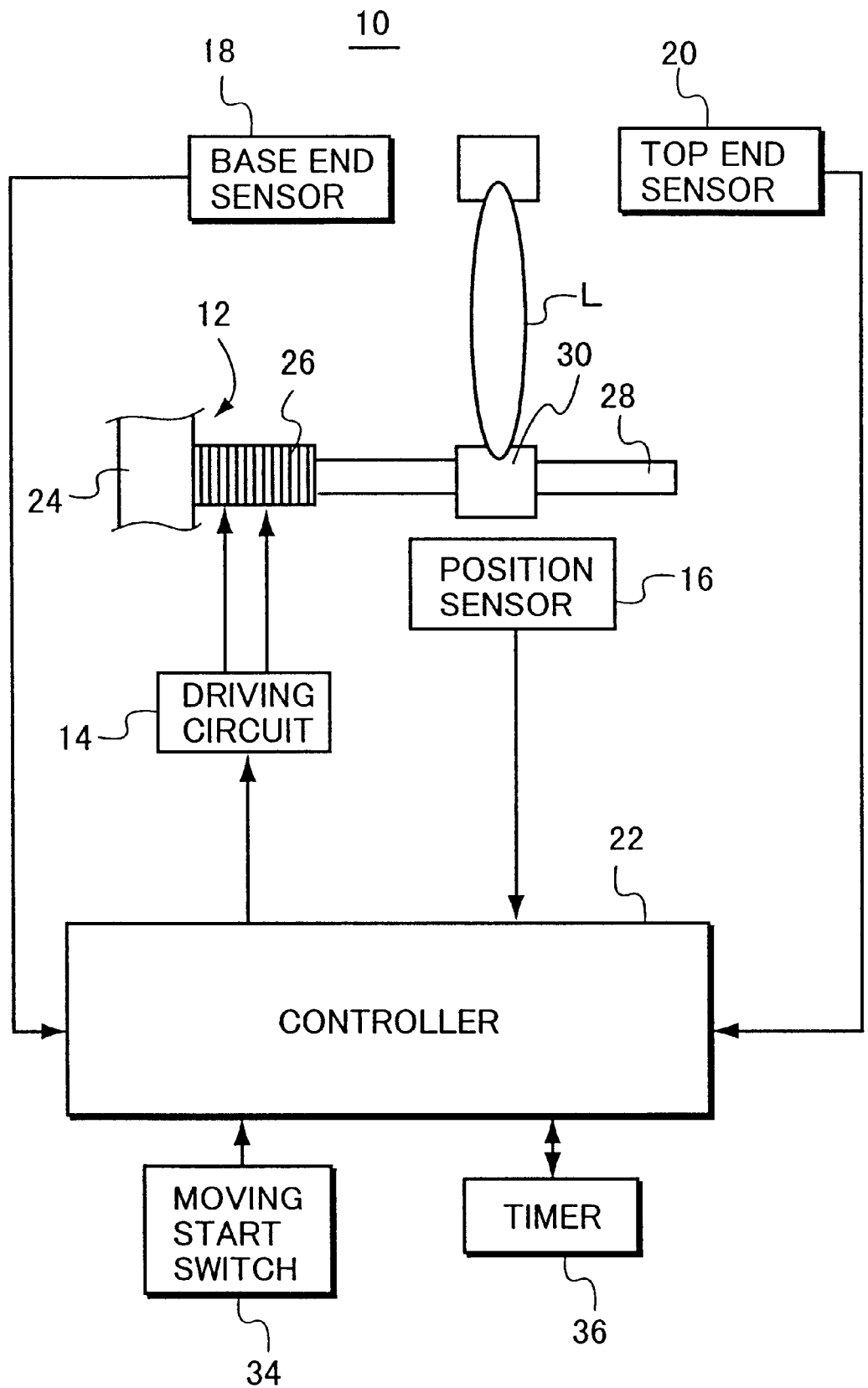
FIG. 1 is a block diagram for showing a configuration of an embodiment of an impact type piezoelectric actuator in accordance with this invention.

An embodiment of a piezoelectric actuator in accordance with this invention is described. FIG. 1 shows a schematic configuration of an impact type piezoelectric actuator in the embodiment. The piezoelectric actuator 10 comprises a driving unit 12, a driving circuit 14 for driving the driving unit 12, a position sensor 16 for sensing a position of a driven member coupled with the driving unit 12, a base end sensor 18 provided in the vicinity of a base end of the driving unit 12, a top end sensor 20 provided in the vicinity of a top end of the driving unit 12, and a controller 22 for controlling the piezoelectric actuator 10.

Figure 2:
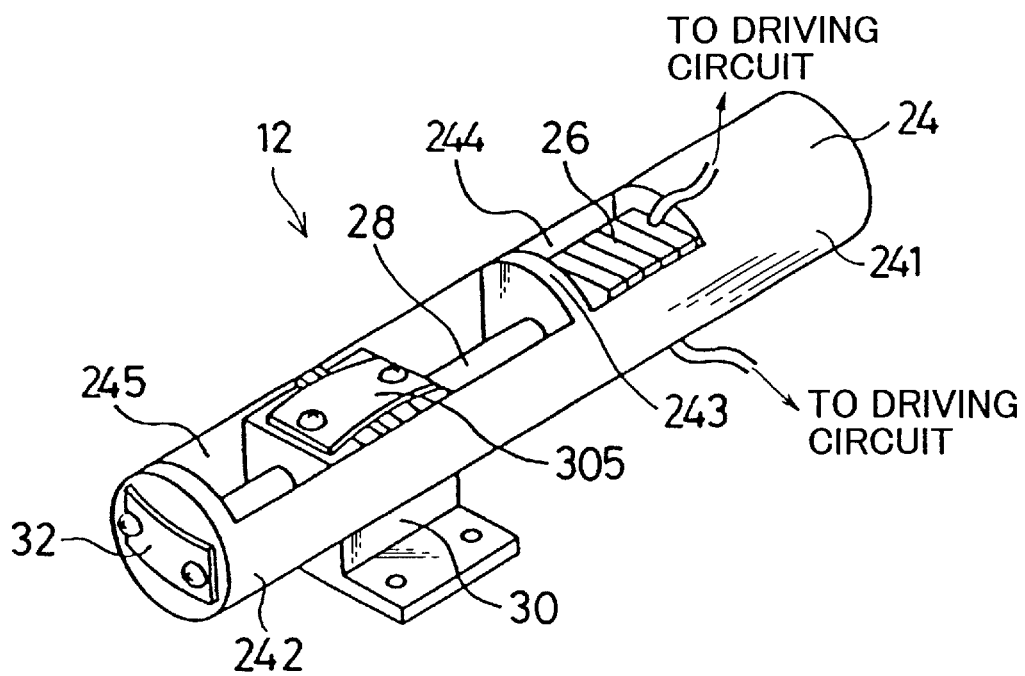
FIG. 2 is a perspective view for showing a detailed configuration of a driving unit of the piezoelectric actuator in the embodiment.

Detailed configuration of the driving unit 12 is shown in FIG. 2. The driving unit 12 is configured by a holder 24, a piezoelectric device 26, a driving member 28, a driven member 30, and so on. The holder 24 for holding the piezoelectric device 26 and the driving member 28 has a first cavity 244 and a second cavity 245 separated by a partition 243. The piezoelectric device 26 is contained in the first cavity 244 in a manner so that a direction of lamination of ceramic thin plates coincides with an axial direction of the holder 24. The driven member 30 and a part of the driving member 28 are contained in the second cavity 245.

The piezoelectric device 26 is configured by piling up of a plurality of ceramic thin plates having piezoelectric characteristics and electrodes disposed for contacting both faces of each piezoelectric thin plate. The ceramic thin plates and the electrodes are fixed by an adhesive in a manner so that the polarization of adjoining two piezoelectric thin plates are opposite to each other. Since the driving voltage is applied between adjoining two electrodes contacting each piezoelectric thin plate, an electric field generated between each adjoining two electrode becomes alternative. Thus, each piezoelectric thin plate expands and contracts in the same direction, so that the expansion and contraction of the piezoelectric device 26 becomes larger.

The base end of the piezoelectric device 26 is fixed on a wall of the first cavity 244 facing the partition 243. Bearing holes having substantially the same cross-section as but a little larger than the cross-section of the driving member 28 are formed on a top end wall 242 and the partition 243. The driving member 28, which is a rod having, for example, a circular cross-section, is borne by the bearing holes so as to be moved in the axial direction of the holder 24. The cross-sectional shape of the driving member 28 is not restricted by the circular shape. It is possible to have the elliptic cross-section, rectangular cross-section, and so on.

A rear end of the driving member 28 protruded in the first cavity 244 is fixed on a top end of the piezoelectric device 26 facing the partition 243. A top end of the driving member 28 protruded from the holder 24 contacts a plate spring 32 by which the driving member 28 is pressed toward the piezoelectric device 26. The displacement of the driving member 28 in the axial direction by the expansion and contraction of the piezoelectric device 26 can be made stable by the pressing force of the plate spring 32.

Figure 3:
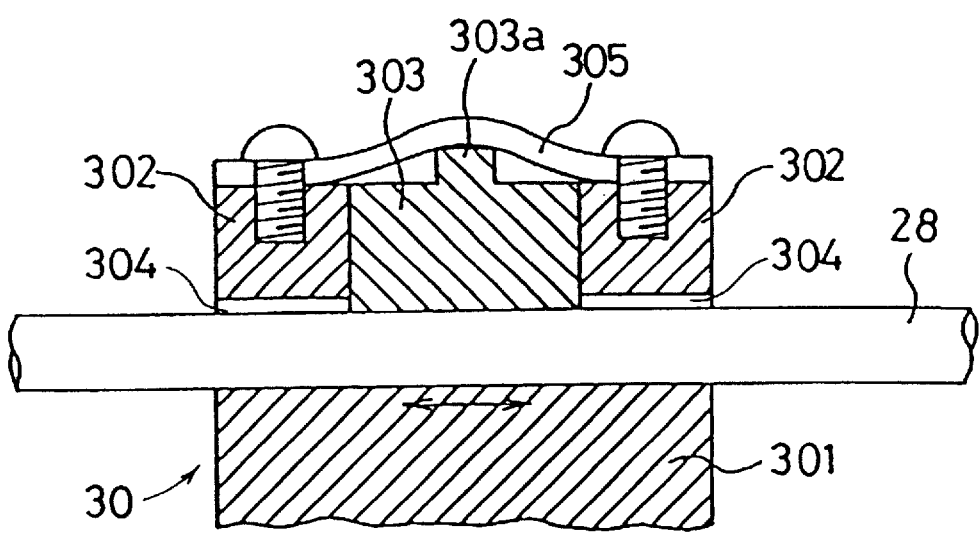
FIG. 3 is a cross-sectional view for showing a configuration of a driven member of the piezoelectric actuator in the embodiment.

FIG. 3 shows a cross-sectional shape of the driven member 30 parallel to the axial direction. The driven member 30 has a base member 301 with a pair of walls 302 and a nipping member 303 provided between the walls 302. Bearing holes 304 having substantially the same as but a little larger than the cross-section of the driving member 28 are formed in the vicinities of stem portions of the walls 302. The driving member 28 is freely borne by the bearing holes 304 so as to be moved in the axial direction. A protrusion 303a is formed on a top face of the nipping member 303. A plate spring 305 is fixed between top faces of the walls 302 so as to press the protrusion 303a of the nipping member 303 toward the driving member 28. The driving member 28 is nipped between the base member 301 and the nipping member 303 by the pressing force of the plate spring 305. Thus, the driven member 30 is movably coupled with the driving member 28.

When the piezoelectric device 26 repeats the expansion and contraction, the driving member 28 repeats reciprocal movement in the axial direction. Intensity of the pressing force of the plate spring 305 is adjusted in a manner so that a friction force acting between the driving member 28 and the driven member 30 in quick movement of the driving member 28 becomes smaller than that in slow movement of the driving member 28. When the driving member 28 is quickly moved, the dynamic force for moving the driving member 28 becomes larger than the friction force between the driving member 28 and the driven member 30, so that the driven member 30 moves in the opposite direction relative to the movement of the driving member 28 owing to the inertia of the driven member 30. When the driving member 28 is slowly moved, the static force for moving the driving member 28 is smaller than the friction force between the driving member 28 and the driven member 30, so that the driven member 30 moves with the driving member 28 in the same direction as the movement of the driving member 28.

In this embodiment, the plate spring 305 is used for generating the friction force between the driving member 28 and the driven member 30. It, however, is possible to use another elastic member such as a coil spring and a rubber member instead of the plate spring. As can be seen from FIG. 1, a taking lens L, which is an object to be moved, is fixed to the driven member 30.

Figure 4:
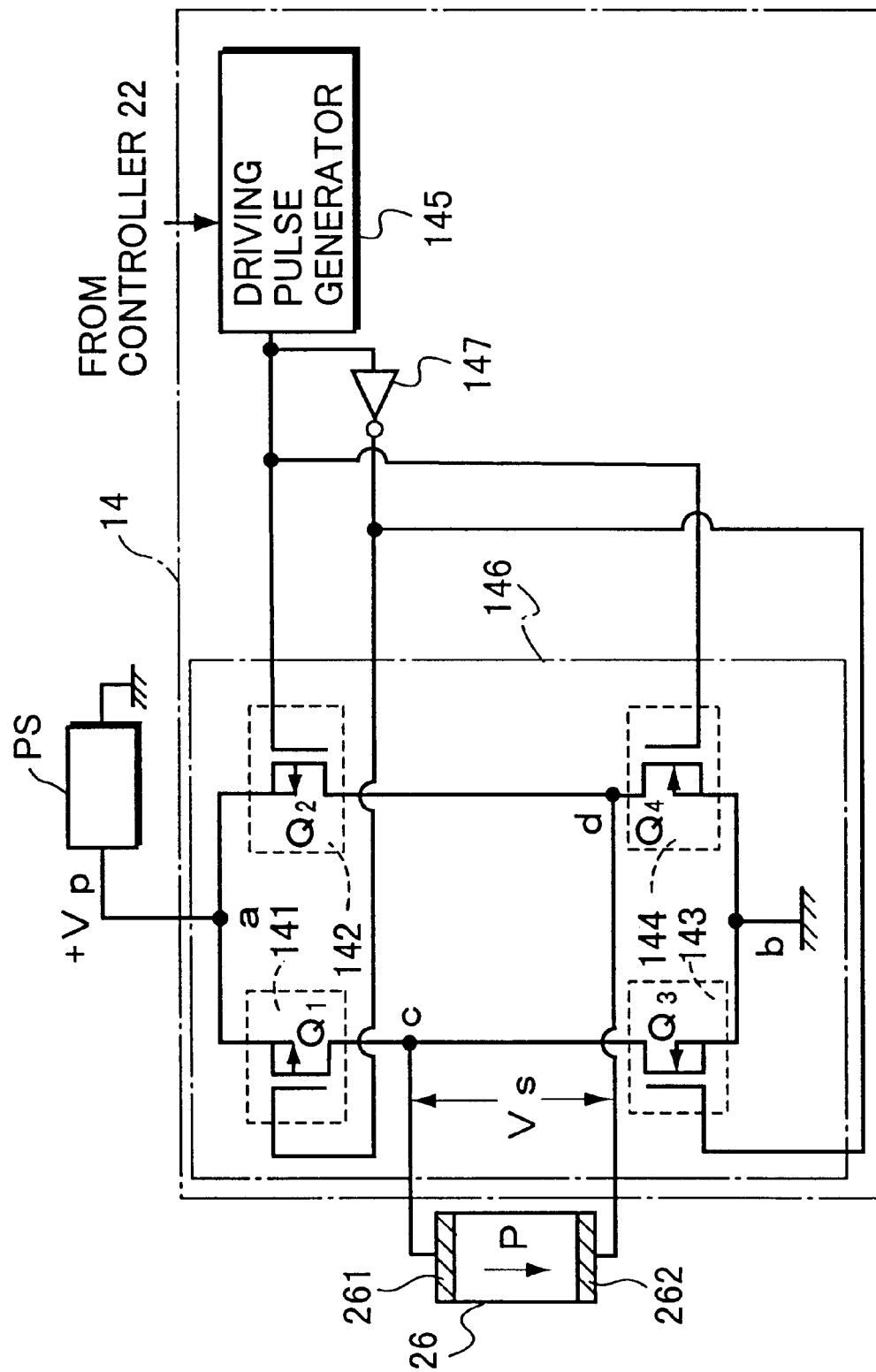
FIG. 4 is a circuit diagram for showing a detailed configuration of a driving apparatus or a driving circuit of the piezoelectric actuator in the embodiment.

Detailed configuration of the driving circuit 14 is shown in FIG. 4. A first series circuit of a first switching circuit 141 and a second switching circuit 142 is connected between connection points "a" and "b". A second series circuit of a third switching circuit 143 and a fourth switching circuit 144 is connected between the connection points "a" and "b" parallel to the first series circuit. The first to fourth switching circuits 141 to 144 are respectively configured by switching elements Q1 to Q4 which are, for example, MOS-FETs. The switching elements Q1 and Q2 are P-channel type FETs. The switching elements Q3 and Q4 are N-channel type FETs. The piezoelectric device 26 is connected between a connection point "c" of the first switching circuit 141 and the third switching circuit 143 and a connection point "d" of the second switching circuit 142 and the fourth switching circuit 144. Thus, the first to fourth switching circuits 141 to 144 configures a bridge circuit 146. When the polarization direction of the piezoelectric device 26 is set to be a direction shown by arrow P in FIG. 4, the connection point "c" is connected to a first electrode (or a positive electrode) 261 and the connection point "d" is connected to a second electrode (or a negative electrode) 262.

A driving voltage +Vp of a driving power source PS is supplied to the connection point "a". The connection point "b" is grounded. A driving pulse generator 145 serving as a control signal supply is connected to respective ones of the first to fourth switching circuits 141 to 144 for supplying driving signals thereto. The driving signal from the driving pulse generator 145 is directly supplied to gate terminals of the second switching circuit 142 and the fourth switching circuit 144. The driving signal from the driving pulse generator 145 is inverted by an inverter 147 and the inverted driving signal is supplied to gate terminals of the first switching circuit 141 and the third switching circuit 143.

In the driving circuit 14, the polarity of the driving voltage applied between the connection points "a" and "b" and the polarization direction of the piezoelectric device 26 connected between the connection points "c" and "d" can freely be selected. In the driving circuit 14 shown in FIG. 4, the polarity of the driving voltage applied to the connection point "a" is positive, the polarization direction of the piezoelectric device 26 is selected to be the direction shown by arrow P, and the first electrode 261 of the piezoelectric device 26 is connected to the connection point "c". The first switching circuit 141 and the fourth switching circuit 144 configures a first driving circuit for charging electric charge into the piezoelectric device 26 until a voltage Vs between the electrodes 261 and 262 reaches to +Vp by applying the driving voltage Vp in the same direction as the polarization. The second switching circuit 142 and the third switching circuit 143 configures a second driving circuit for discharging the electric charge from the piezoelectric device 26 until the voltage Vs reaches to −Vp by applying the driving voltage Vp in the opposite direction to the polarization. When the piezoelectric device 26 is charged to −Vp, the first driving circuit discharges the electric charge by the second driving circuit and charges the piezoelectric device to +Vp.

When the piezoelectric device 26 is connected in the opposite direction to the direction shown in FIG. 4, the second switching circuit 142 and the third switching circuit 143 configures the first driving circuit for charging the piezoelectric device 26 in the same direction as the polarization, and the first switching circuit 141 and the fourth switching circuit 144 configures the second driving circuit for charging the piezoelectric device 26 in the opposite direction to the polarization.

By the above-mentioned configuration, the voltage −Vp to +Vp is applied to the piezoelectric device 26, so that it is equivalent that the driving voltage of the piezoelectric device 26 becomes double (2Vp). Thus, it is possible to provide a piezoelectric actuator which can output a large displacement though the driving voltage is relatively lower.

Figure 5:
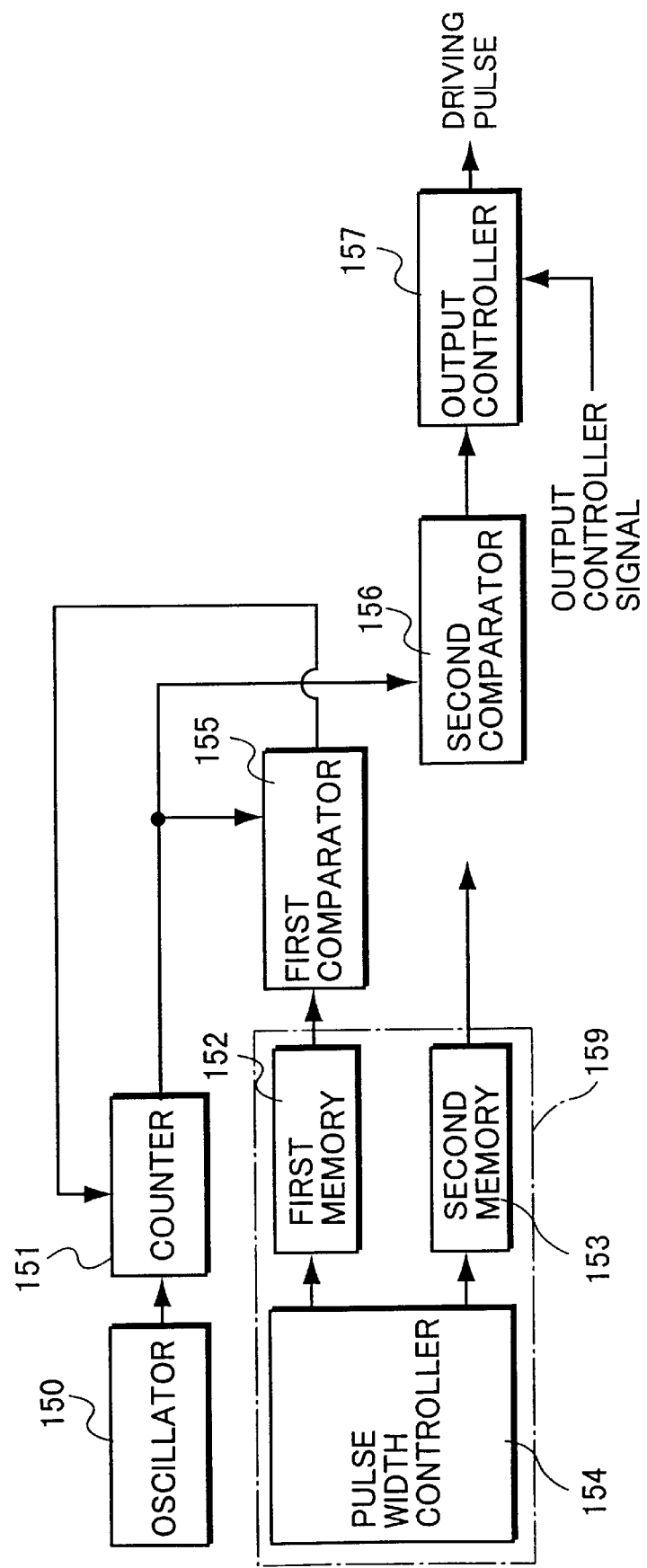
FIG. 5 is a block diagram of a driving pulse generator of the driving apparatus or the driving circuit in the embodiment.

A block diagram of the driving pulse generator 145 is shown in FIG. 5. The driving pulse generator 145 comprises an oscillator 150, a counter 151, a first memory 152, a second memory 153, a pulse width controller 154, a first comparator 155, a second comparator 156 and an output controller 157. The oscillator 150 is, for example, a quartz oscillator generating clock pulses of 125 ns. The counter 151 counts a number of pulse signals outputted from the oscillator 150 and outputs the counted number. The first memory 152 is used for setting a period of a driving pulse. The second memory 153 is used for setting a charging time of the piezoelectric device 26. The pulse width controller 154 controls timings of ON and OFF of the driving pulse by setting predetermined values (or time periods) to the first memory 152 and the second memory 153. When a reset signal is inputted to the counter 151 from the first comparator 155 which will be described below, the counter 151 resets the counted number of the pulse signals to zero. The first comparator 155 compares a set value $T_M$ of the first memory 152 with the counted number $T_C$ outputted from the counter 151, and outputs the reset signal to the counter 151 when the counted number $T_C$ reaches to the set value $T_M$ ($T_C \geq T_M$). The second comparator 156 compares the set value $T_N$ of the second memory 153 with the counted number $T_C$ outputted from the counter 151, outputs a high level signal "H" when the counted number $T_C$ is smaller than the set value $T_N$ ($T_C < T_N$) and outputs a low level signal "L" when the counted number $T_C$ reaches to the set value $T_N$ ($T_C \geq T_N$). The output controller 157 is driven corresponding to output control signal from the controller 22 for outputting the output signal from the second comparator 156 as the driving pulses when the driving pulses are outputted and for fixing the driving pulse at high level when outputting of the driving pulse is stopped.

Motion of the driving pulse generator 145 is described with reference to timing charts shown in FIG. 6. When the counted number $T_C$ of the counter 151 reaches to the set value $T_N$ of the second memory 153 at timing P1, the output level of the output controller 156 turns to "LOW" level from "HIGH" level. When the counted number $T_C$ of the counter 151 reaches to the set value $T_M$ of the first memory 152 at timing P2, the output level of the output controller 156 turns to "HIGH" level from "LOW" level. The reset signal is inputted to the counter 151 from the first comparator 155 at the same time as the timing P2, so that the counted number $T_C$ of the counter 151 is reset to zero. By repeating the above-mentioned operation, driving pulses are continuously outputted at a predetermined period from the driving pulse generator 145. The first memory 152 used for setting the period of the driving pulse, the second memory 153 used for setting the charging time of the piezoelectric device 26 and the pulse width controller 154 configures a setting data modifier 159 for setting the driving time period of the first driving circuit and the second driving circuit and for setting the charging time so as to make the driving period be constant.

Figure 6:
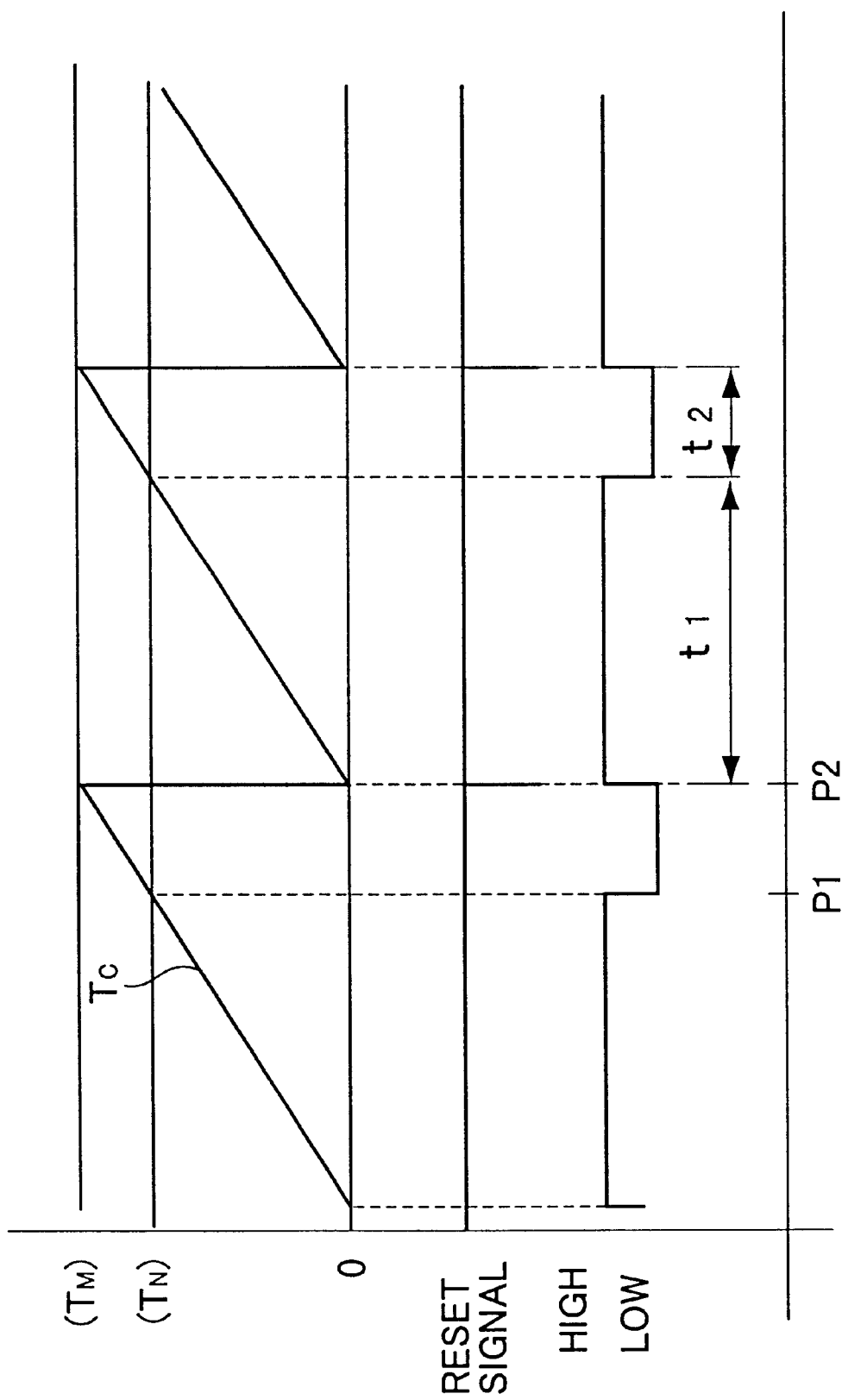
FIG. 6 is a timing chart for showing waveforms of a driving voltage, reset pulses and driving pulses in the driving apparatus or the driving circuit in the embodiment.

The first driving circuit configured by the first switching circuit 141 and the fourth switching circuit 144 is driven in a time period t1 in FIG. 6 while the output level of the output controller 157 is "HIGH". The second driving circuit configured by the second switching circuit 142 and the third switching circuit 143 is driven in a time period t2 in FIG. 6 while the output level of the output controller 157 is "LOW". It is possible to adjust the duty ratio of the driving time period t1 corresponding to "ON" time period of the first driving circuit and the driving time period t2 corresponding to "ON" time period of the second driving circuit by setting the set value $T_M$ of the first memory 152 constant and the set value $T_N$ of the second memory 153 changeable. Alternatively, the driving period consisting of the "ON" time period t1 of the first driving circuit and the "ON" time period t2 of the second driving circuit can be adjusted by changing the set value $T_M$ of the first memory 152.

As shown in FIG. 1, the position sensor 16 such as a magneto resistive effect device or a position sensitive device is provided in a movable region of the driven member 30. The base end sensor 18 and the top end sensor 20 are configured by, for example, a photo-interrupter. The controller 22 is configured by a CPU, a ROM for memorizing processing program and data, a RAM temporarily for memorizing the data, and so on. The controller 22 controls the driving pulse generator 145 by using the signals from the sensors 16, 18 and 20 for driving the first driving circuit and the second driving circuit alternatively. In other words, the controller 22 serves as a driving controller for driving the first driving circuit configured by the first switching circuit 141 and the fourth switching circuit 144 and the second driving circuit configured by the second switching circuit 142 and the third switching circuit 143. A moving start switch 34 for instructing to move the driven member 30 and a timer 36 used for sensing a moving speed of the driven member 30 are connected to the controller 22.

The piezoelectric actuator 10 as configured above has no constant current circuit for restricting charging and discharging currents configured by many elements such as a transistor, a zener diode, resistors, and so on. Thus, the driving circuit 14 can be configured as simple as possible. Since the driving circuit 14 can be made simple and small, the piezoelectric actuator 10 can be downsized. Furthermore, the piezoelectric actuator 10 uses no constant current circuit, so that the charging speed to the piezoelectric device 26 in the same direction as the polarization thereof substantially coincides with the discharging speed from the piezoelectric device 26 in the opposite direction to the polarization.

Figure 7:
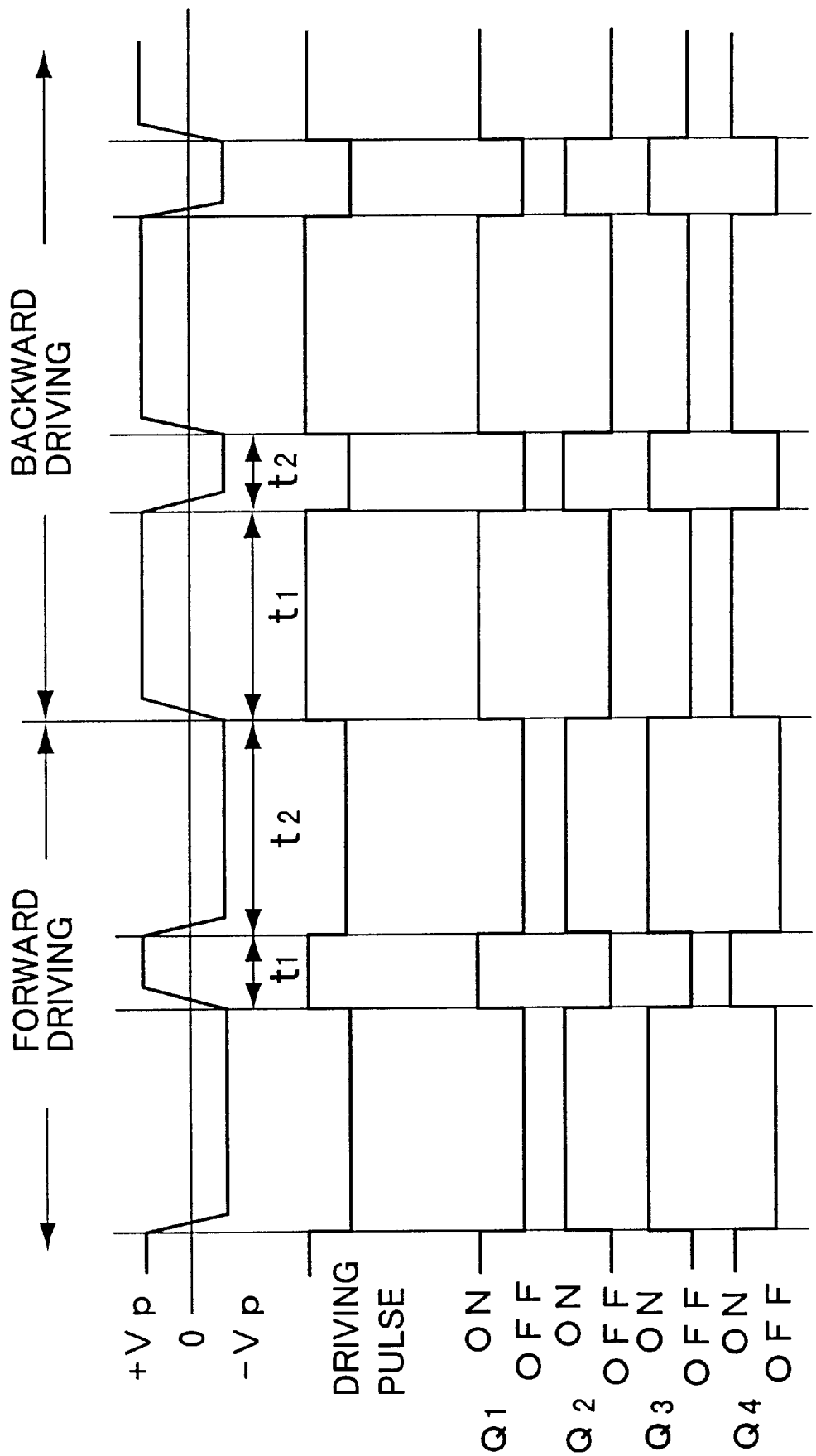
FIG. 7 is a timing chart for showing waveforms of the driving voltage applied to the piezoelectric device, the driving pulses and ON and OFF of switching elements Q1 to Q4 shown in FIG. 4.

Waveforms of the driving voltage applied to the piezoelectric device 26, the driving pulses and ON and OFF of the switching elements Q1 to Q4 are shown in FIG. 7. As can be seen from FIG. 7, the driving pulses outputted from the driving pulse generator 145 are directly inputted to the switching elements Q2 and Q4 as the driving control signals when the piezoelectric actuator 10 is driven. On the other hand, the driving pulses outputted from the driving pulse generator 145 are inverted by the inverter 147 and the inverted driving pulses are inputted to the switching elements Q1 and Q3 as the driving control signals. By such operations, a group of the switching elements Q1 and Q4 and another group of the switching elements Q2 and Q3 are alternatively switched on and off For moving the driven member 30 toward the top end of the holder 24 (hereinafter, this motion is called "forward driving"), the duty ratio D (D=t1/(t1+t2)) of the time period t1 in which the first driving circuit is turned on and the time period t2 in which the second driving circuit is turned on is selected to be equal to or smaller than 0.5. Alternatively, for moving the driven member 30 toward the base end of the holder 24 (hereinafter, this motion is called "backward driving"), the duty ratio D is selected to be larger than 0.5. In this embodiment, the charging speed and the discharging speed of the piezoelectric device 26 are substantially the same, so that the moving direction (forward driving or backward driving) of the piezoelectric actuator 10 is switched by changing the duty ratio D of the charging and discharging time periods. Since the switching element Q1 and Q2 are P-channel type FETs, the switching elements Q1 and Q2 are turned on when the driving control signal is low level. Since the switching element Q3 and Q4 are N-channel type FETs, the switching elements Q3 and Q4 are turned on when the driving control signal is high level.

The above-mentioned driving method in this embodiment is based on an experimental result that the driven member 30 can be moved relative to the driving member 28 under a predetermined condition by providing a relatively large difference between the charging time in the same direction as the polarization of the piezoelectric device 26 and the discharging time period in the opposite direction to the polarization.

Figure 8:
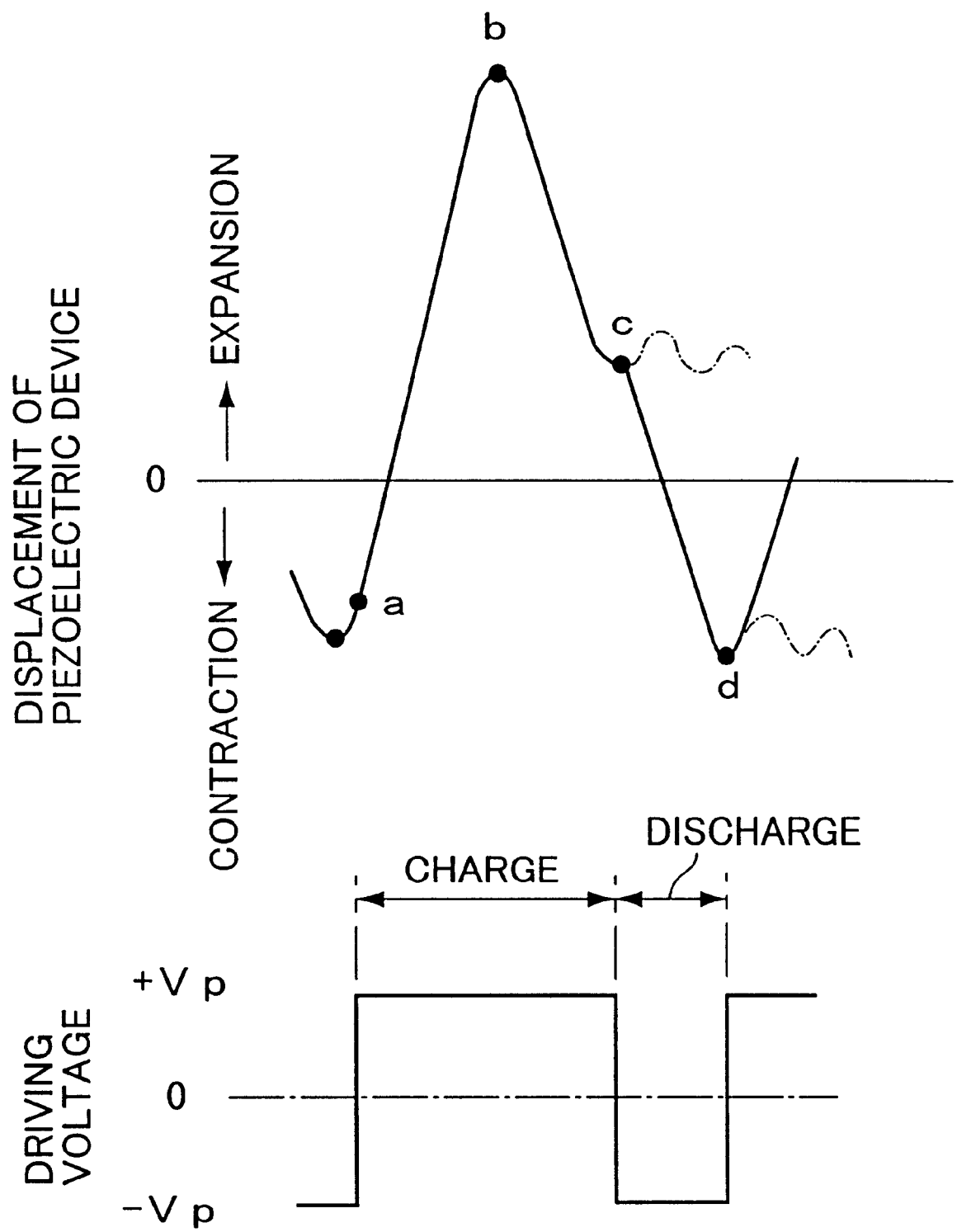
FIG. 8 is a timing chart for showing waveforms of displacement or expansion and contraction quantities of the piezoelectric device and the driving voltage in the embodiment.

FIG. 8 shows a transient response of the displacement of the piezoelectric device 26 when the driving voltage having a predetermined duty ratio D is applied. The reason why the driven member 30 can be moved forward and backward relative to the driving member 28 by changing the duty ratio D of the charging and discharging time periods is described with reference to FIG. 8.

A waveform illustrated in the lower portion in FIG. 8 shows one period (cycle) of the driving voltage having a duty ratio by which the charging time period for applying the driving voltage to the piezoelectric device 26 in the same direction as the polarization becomes longer than the discharging time period for applying the driving voltage to the piezoelectric device 26 in the opposite direction to the polarization. Another waveform illustrated in the upper portion in FIG. 8 shows the transient expansion and contraction of the piezoelectric device 26 or the transient displacement of the driving member 28 when the driving voltage is applied to the piezoelectric device 26. The transient waveform of the expansion and contraction of the piezoelectric device 26 is illustrated only the fundamental wave of the resonance frequency, for convenience.

When the driving voltage +Vp is applied to the piezoelectric device 26 in the same direction of the polarization, the voltage between the first electrode 261 and the second electrode 262 becomes higher so that the piezoelectric device 26 expands corresponding to the voltage. When the driving voltage −Vp is applied to the piezoelectric device 26 in the opposite direction to the polarization, the voltage between the first electrode 261 and the second electrode 262 becomes lower so that the piezoelectric device 26 contracts corresponding to the voltage.

The piezoelectric device 26 and the driving member 28, however, have elasticity. When the expansion of the piezoelectric device 26 is transiently observed, the piezoelectric device 26 expands to a predetermined length with vibration having a predetermined resonance frequency defined by the piezoelectric device 26, the driving member 28, the driven member 30, and so on. When the driving voltage +Vp is applied to the piezoelectric device at point "a" in FIG. 8, the piezoelectric device 26 quickly and largely expands and turns to contract at point "b". Subsequently, the piezoelectric device 26 repeats the expansion and contraction so as to converge to the predetermined expansion in the vicinity of point "c" (see one dotted chain line started from the point "c").

Such transient motion can be applied to the contraction of the piezoelectric device 26. When the driving voltage −Vp is applied to the piezoelectric device 26 after the application of the driving voltage +Vp, the piezoelectric device 26 quickly and largely contracts and turns to expand at a predetermined displacement. Subsequently, the piezoelectric device 26 repeats the contraction and expansion so as to converge to a predetermined contraction in the vicinity of point "d" (see one dotted chain line started from the point "d").

It is considered to apply the driving voltage having the waveform shown in FIG. 8 repeatedly to the piezoelectric device 26. When the voltage +Vp is applied to the piezoelectric device 26 at the point "a" under a condition that the piezoelectric device 26 is charged to the voltage −Vp, the piezoelectric device 26 quickly expands to the point "b". Subsequently, the piezoelectric device 26 contracts to the point "c" at a speed slower than the expansion speed. As can be seen from FIG. 8, the slope between the points "b" to "c" is more gentle than the slope between the points "a" to "b". This is because the contraction quantity becomes smaller than the expansion quantity owing to the viscosity of the piezoelectric device 26, the driving member 28, and so on, when the expansion and the contraction occur in the same time periods.

Subsequently, when the voltage −Vp is applied to the piezoelectric device 26 at the point "c" at which the contraction of the piezoelectric device 26 is completed, the piezoelectric device 26 is discharged and further charged by the voltage −Vp. Thus, the piezoelectric device 26 further contracts to the point "d". The expansion quantity of the piezoelectric device 26 substantially coincides with the contraction quantity when the discharge is stationary discharged, so that the contraction speed becomes slower than the expansion speed between the points "a" to "b". The slope between the points "c" to "d" becomes more gentle than the slope between the points "a" to "b". The time period between the points "a" to "c" corresponds to one period of the resonance frequency of the piezoelectric device 26, when it is charged in the same direction as the polarization.

Subsequently, when the voltage +Vp is applied to the piezoelectric device 26 at the point "d" at which the contraction of the piezoelectric device 26 is completed, the piezoelectric device 26 is charged by the voltage +Vp, again. The piezoelectric device 26 quickly expands. The time period between the points "c" to "d" corresponds to a half period of the resonance frequency of the piezoelectric device 26 when it is charged in the opposite direction to the polarization. Waveforms corresponding to the motion of the driven member 30, the displacement of the driving member 30 or the expansion and contraction of the piezoelectric device 26, and the driving signals are shown in FIG. 9.

As mentioned above, the piezoelectric device 26 quickly expands and slowly contracts. When the driving member 28 repeats the reciprocal motion responding to the expansion and contraction of the piezoelectric device 26, the friction force between the driving member 28 and the driven member 30 becomes higher in the quick forward movement of the driving member 28 and becomes lower in the slow backward movement of the driving member 28. Thus, the driven member 30 relatively moves backward with the driving member 28.

Figure 9:
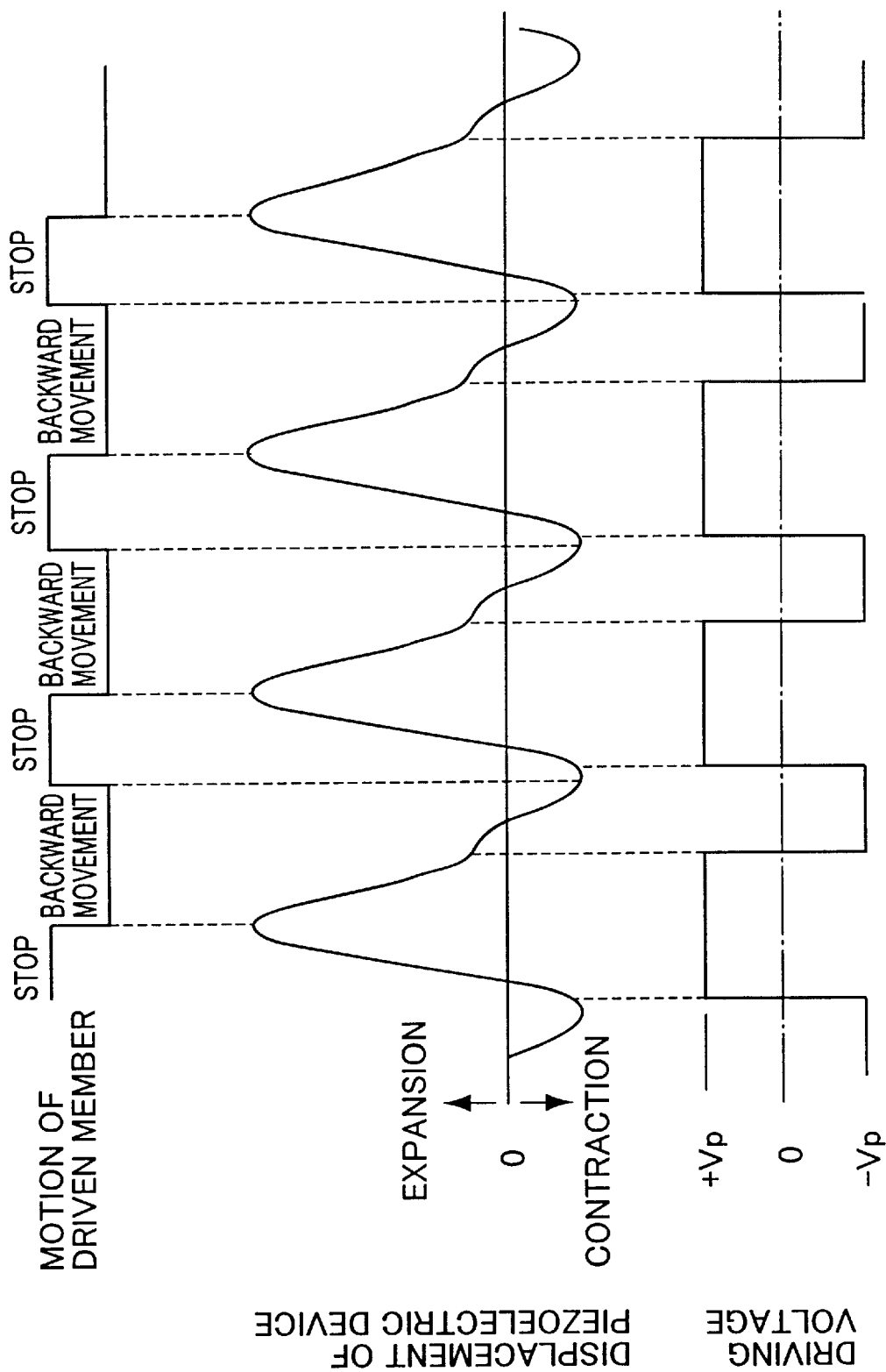
FIG. 9 is a timing chart for showing motion of the driven member and the waveforms of the displacement of the piezoelectric device and the driving voltage in the embodiment.

FIG. 9 shows an example of motion of the driven member when the driving voltage having the duty ration D, in which the charging time period is longer than the discharging time period, is applied to the piezoelectric device 26. When another driving voltage having a duty ratio, in which the charging time period is shorter than the discharging time period, is applied to the piezoelectric device 26, the above-mentioned relation between the charging speed and the discharging speed becomes the inverse. The piezoelectric device 26 quickly contracts when it is charged by the voltage −Vp, and slowly expands when it is charged by the voltage +Vp. The driven member 30 repeats stop and movement responding to the reciprocal movement of the driving member 28, so that it moves relatively forward.

When the driving pulse having a duty ratio larger than 0.5 from the driving pulse generator 145 (see FIG. 4), the piezoelectric device 26 alternately repeats the quick expansion and slow contraction, so that the driven member 30 moves toward the base end of the holder 24 (backward movement). Alternatively, when the driving pulse having a duty ratio equal to or smaller than 0.5 from the driving pulse generator 145, the piezoelectric device 26 alternately repeats the slow expansion and quick contraction, so that the driven member 30 moves toward the top end of the holder 24 (forward movement).

In order to move the driven member 30 in a desired direction stably, it is preferable that the charging time period (between the points "a" to "c" in FIG. 8) should be set to substantially one period of the resonance frequency of the piezoelectric device 26 when the piezoelectric device 26 is charged in the same direction as the polarization. Furthermore, it is preferable that the discharging time period (between the points "c" to "d" in FIG. 8) should be set to a half period of the resonance frequency when the piezoelectric device is charged in the opposite direction to the polarization. The waveform of the displacement of the piezoelectric device 26 or the driving member 28, however, cannot be the same waveform as shown in FIG. 8 due to a configuration to fix the piezoelectric device 26 on the holder 24, the existence of the driving member 28, and so on. The actual waveform of the displacement of the piezoelectric device 26 or the driving member 28 will be distorted by superimposing of other frequency components. Thus, the driving voltage of the piezoelectric device 26 is adjusted in each piezoelectric actuator 10.

Even though the duty ratio D of the charging time period and the discharging time period is not precisely related to the resonance frequency of the piezoelectric device 26, it is possible to move the driven member 30 forward or backward corresponding to the duty ratio D. Furthermore, it is possible to move the driven member 30 forward by setting the duty ratio D larger than 0.5 and backward by setting the duty ratio D equal to or smaller than 0.5, when the configuration to fix the piezoelectric device 26 on the holder 24 and/or the coupling mechanism of the driving member 28 and the driven member 30 are/is different from the above-mentioned embodiment.

Figure 10:
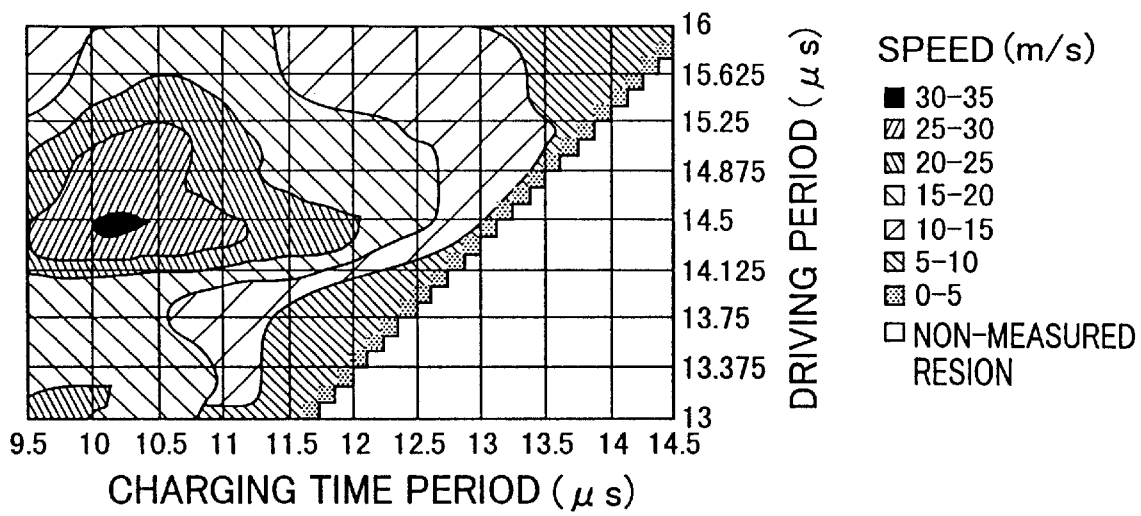
FIG. 10 is a contour map for showing the moving speed of the driven member relative to the driving member with respect to driving period and charging time period in the embodiment.

FIG. 10 is a contour map for showing the moving speed of the driven member 30 relative to the driving member 28 towards the base end of the driving member 28. In FIG. 10, the abscissa shows a charging time period t1 of the piezoelectric device 26 between 9.5 $\mu$s to 14.5 $\mu$s at an interval of 125 ns, and the ordinate shows a driving period tp between 13 $\mu$s to 16 $\mu$s at an interval of 125 ns. Hereupon, the charging time period t1 corresponds to the driving time period t1 of the first driving circuit shown in FIG. 6, and the driving period tp is the sum of the charging time period t1 and the discharging time period t2 corresponding to the driving time period t2 of the second driving circuit shown in FIG. 6.

As can be seen from the contour map shown in FIG. 10, the moving speed of the driven member 30 toward the base end of the driving member 28 becomes the highest in the vicinity of the driving period 14.5 μs and the charging time period of 10.25 μs. Furthermore, the moving speed becomes slower corresponding to variation of the driving period tp or the charging time period t1 in a predetermined region around the highest moving speed. When the driving period tp is fixed to 14.5 μs and the charging time period t1 is gradually decreased from 10.25 μs, the driving speed is varied the most gentle.

The contour map shown in FIG. 10 shows the case that the driven member 30 is moved toward the base end of the driving member 28. The measurement result of the moving speed of the driven member 30 toward the top end of the driving member 28 became substantially the same. The moving speed of the driven member 30 toward the top end of the driving member 28, however, becomes the highest in the vicinity of the driving period of 14.5 μs and the charging time period of 3.25 μs. The moving speed becomes slower corresponding to variation of the driving period tp or the charging time period t1 in a predetermined region around the highest moving speed. When the driving period tp is fixed to 14.5 μs and the charging time period t1 is gradually decreased from 3.25 μs, the driving speed is varied the most gentle.

Figure 11:
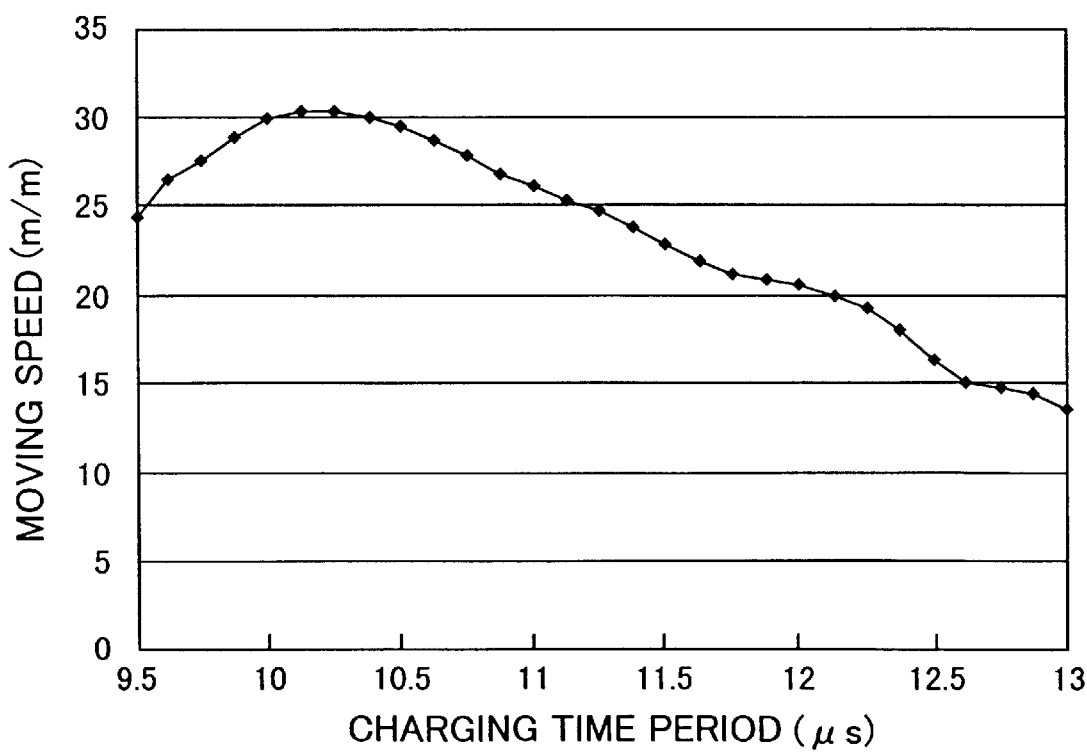
FIG. 11 is a graph for showing a relation between the moving speed of the driven member and the charging time period of the driving circuit in the embodiment.

A relation between the moving speed of the driven member 30 and the charging time period when the driving period is fixed to 14.5 μs is shown in FIG. 11. As can be seen from FIG. 11, the moving speed becomes the highest when the charging time period t1 is in the vicinity of 10.25 μs. When the charging time period t1 becomes longer, the moving speed is gently decreased. In this embodiment, the driving period tp is fixed to 14.5 μs and the charging time period t1 is varied in a region between 11 μs to 12 μs so as to control the moving speed of the driven member 30 in the backward driving. Furthermore, the driving period tp is fixed to 14.5 μs and the charging time period t1 is varied in a region between 2.5 μs to 3.5 μs so as to control the moving speed of the driven member 30 in the forward driving. These control values are based on the experimental result with respect to the embodiment, so that it is necessary to modify the control values corresponding to the configuration of each piezoelectric actuator 10.

Figure 12:
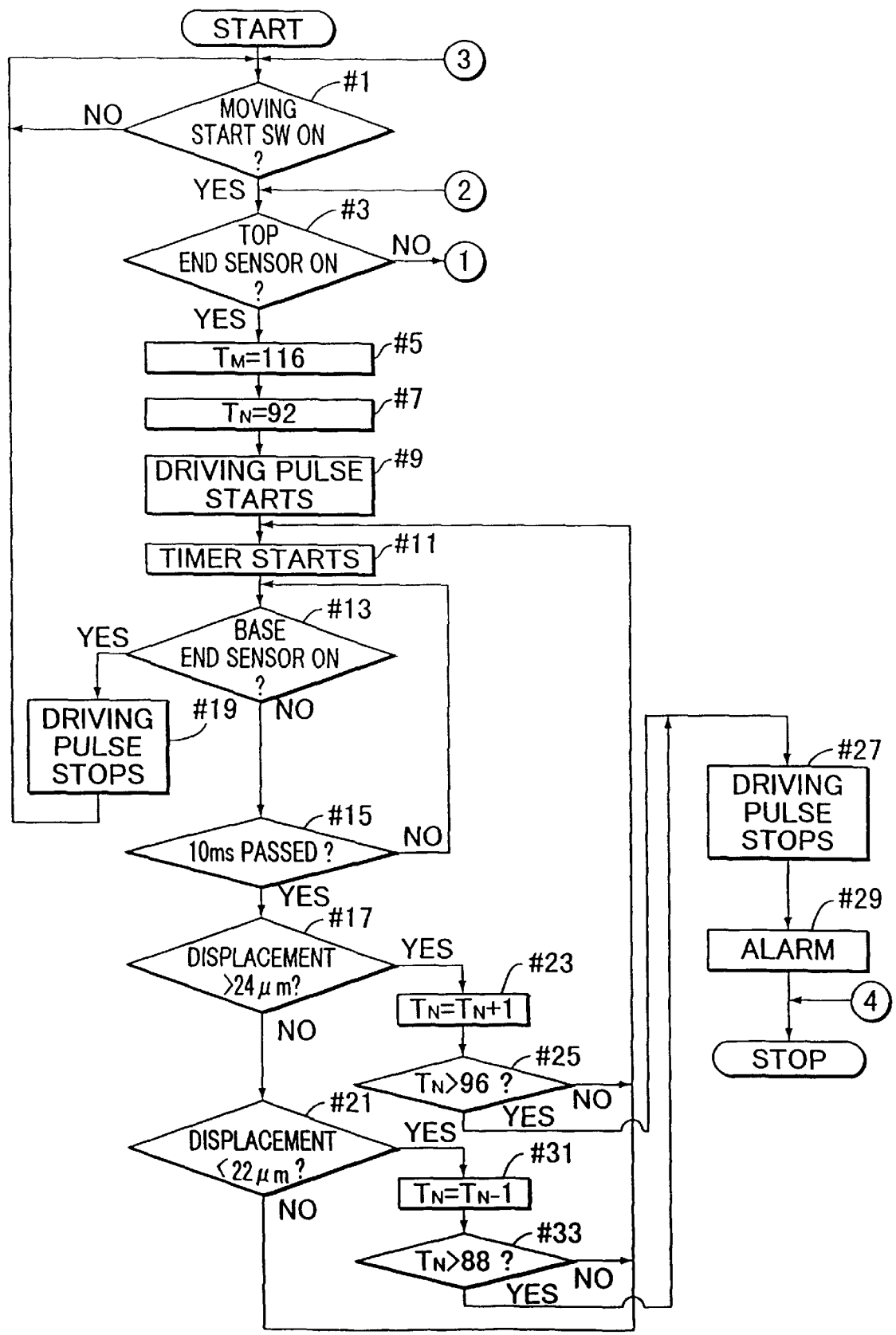
FIG. 12 is a flowchart for showing an operation of the piezoelectric actuator in the embodiment.
Figure 13:
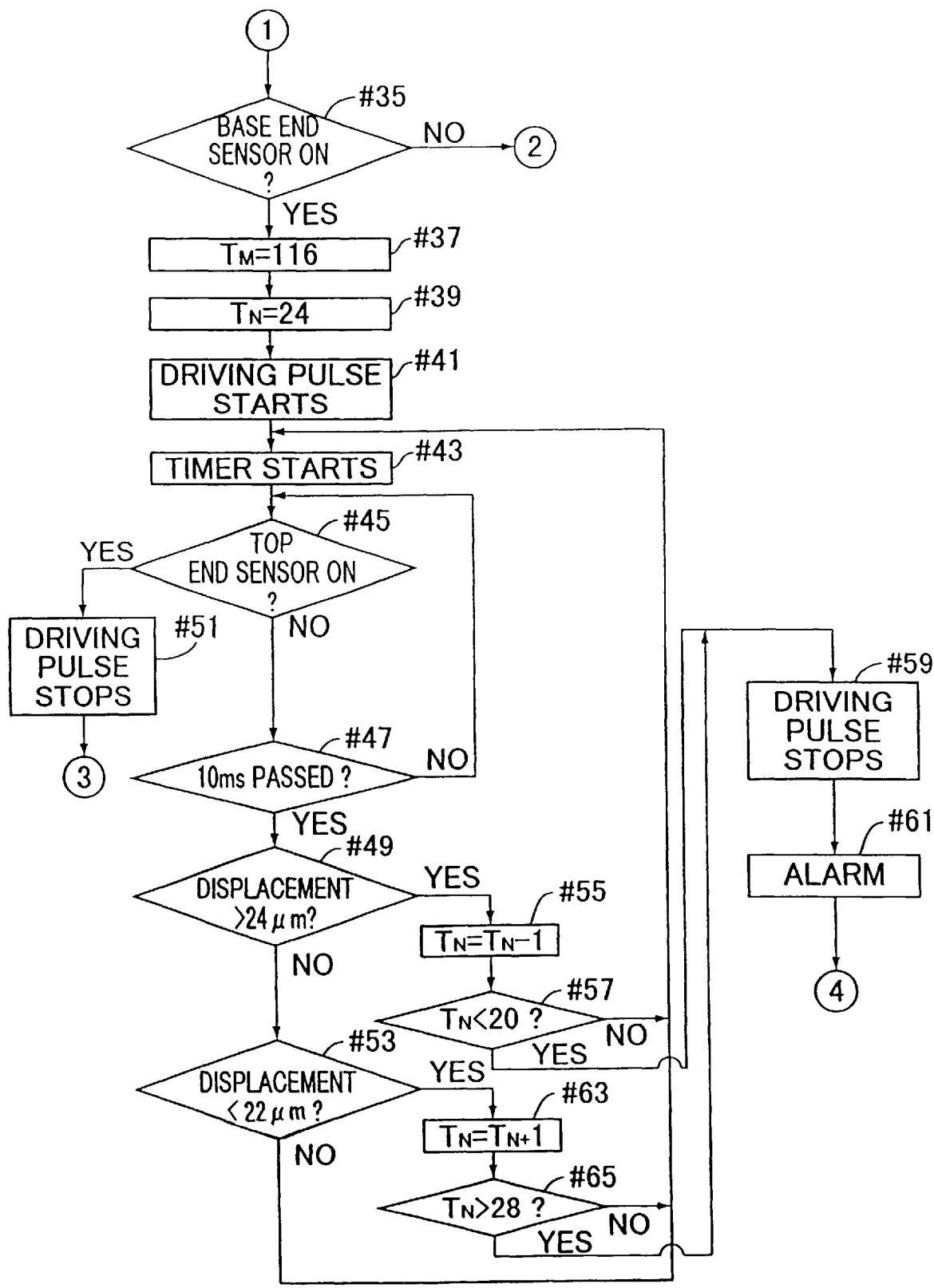
FIG. 13 is a flowchart for showing the sequel of the flowchart shown in FIG. 12.

An operation of the controller 22 for controlling the moving speed of the driven member 30 will be described with reference to flowcharts shown in FIGS. 12 and 13. In the flowcharts, the switches are abbreviated as a symbol "SW".

When a power switch (not shown in the figure) of the piezoelectric actuator 10 is switched on, the controller 22 judges whether the moving start switch 34 is switched on or not (Step #1). When the moving start switch 34 is judged to be turned on, the controller 22 judges whether the top end sensor 20 is switched on or not (Step #3). When the top end sensor is switched on, a value "116" (116×0.125 μs=14.5 μs) is set to the first memory 152 as the set value $T_M$ for setting the period of the driving pulse (driving period) (Step #5). When the moving start switch has not been switched on (NO in the step #1), the controller 22 waits until the moving start switch 34 is switched on.

Subsequently, a value "92" (92×0.125 μs=11.5 μs) is set to the second memory 153 as the set value $T_N$ for setting the period of the charging time period (Step #7). After that, the driving pulse generator 145 starts to output the driving pulses (Step #9). Simultaneously, the timer 36 starts to count a time corresponding to the movement of the driven member 30 (Step #11). The controller 22 judges whether the base end sensor 18 is switched on or not (Step #13). When the base end sensor 18 has not been switched on, the controller 22 judges whether a predetermined time, for example, 10 ms has passed or not (Step #15). When the predetermined time has passed, the controller 22 further judges whether the displacement or moving quantity of the driven member 30 is larger than a first predetermined distance, for example, 24 μm or not (Step #17).

When the base end sensor 18 is switched on (YES in the step #13), outputting of the driving signals is stopped (Step #19). The controller 22 returns to the step #1 to repeat the above-mentioned steps. When the predetermined time has not been passed (NO in the step #15), the controller 22 returns to the step #13 to repeat the steps #13 and #15. The judgement of time passing in the step #15 is based on an output of the timer 36. The judgement of displacement of the driven member 30 in the step #17 is based on an output of the position sensor 16. Concretely, the driven member 30 is moved under the condition of the driving period of 14.5 μs and the charging time period of 11.5 μs until the predetermined time, for example, 10 ms has passed. When the driven member 30 has reached to the base end of the driving member 28 until the predetermined time has passed, the driven member 30 cannot be moved further, so that the outputting of the driving pulse is stopped.

When the displacement of the driven member 30 is not larger than the first predetermined distance, the controller 22 further judges whether the displacement of the driven member 30 is smaller than a second predetermined distance, for example, 22 μm or not (Step #21). When the displacement of the driven member 30 is equal to or larger than the second predetermined distance in the step #21, the controller 22 returns to the step #11 so as to repeat the above-mentioned steps. Concretely, when the driven member 30 remains in a predetermined region, for example, 22 μm to 24 μm after passing a predetermined time, for example, 10 μs, the driven member 30 is moved under the condition of the driving period of 14.5 μs and the charging time period of 11.5 μs.

When the displacement of the driving member 30 is larger than the first predetermined distance (YES in the step #17), a value "1" corresponding to 0.125 μs is added to the set value $T_N$ of the second memory 153 (Step #23). Subsequently, the controller 22 judges whether the set number $T_N$ of the second memory 153 is larger than 96 or not (Step #25). When the set value $T_N$ is larger than 96, the controller 22 stops outputting the driving signals (Step #27) and displays an alarm message on a monitor display (not shown in the figure) (Step #29). The controller 22 stops the operation for moving the piezoelectric actuator 10. Concretely, when the displacement of the driven member 30 is larger than the first predetermined distance, for example, 24 μm, the charging time period is gradually increased from 11.5 μs, so that the moving speed of the driven member 30 is gradually decreased. Furthermore, when the driven member 30 has not reached to the position of the base end sensor 18 until the charging time period becomes equal to or larger than 12 μs, the controller 22 judges that a trouble occurs in the piezoelectric actuator 10. The controller 22 stops to output the driving signals and outputs the alarm, simultaneously.

When the displacement of the driven member 30 is smaller than the second predetermined time, for example, 22 μs (YES in Step #21), a value "1" corresponding to 0.125 μs is subtracted from the set value $T_N$ of the second memory 153 (Step #31). Subsequently, the controller 22 judges whether the set number $T_N$ of the second memory 153 is smaller than 88 or not (Step #33). When the set value $T_N$ is smaller than 88, the controller 22 stops outputting the driving signals (Step #27). Alternatively, when the set value $T_N$ is equal to or larger than 88, the controller 22 returns to the step #11 to repeat the above-mentioned steps. Concretely, when the displacement of the driven member 30 is smaller than the second predetermined distance, for example, 22 µm after passing a predetermined time, for example, 10 µs, the charging time period is gradually decreased from 11.5 µs, so that the moving speed of the driven member 30 is gradually increased. Furthermore, when the driven member 30 has not reached to the position of the base end sensor 18 until the charging time period becomes equal to or larger than 11 µs, the controller 22 judges that a trouble occurs in the piezoelectric actuator 10. The controller 22 stops outputting the driving signals and outputs the alarm, simultaneously.

The above-mentioned steps #5 to #33 relate to the movement of the driven member 30 from the top end toward the base end of the driving member 28. On the other hand, the steps which will be described below relate to the movement of the driven member 30 from the base end toward the top end of the driving member 28.

When the top end sensor 20 has not been switched on (NO in Step #3), the controller 22 judges whether the base end sensor 18 is switched on or not (Step #35). When the base end sensor 18 is switched on, a value "116" (116×0.125 µs=14.5 µs) is set to the first memory 152 as the set value $T_M$ for setting the period of the driving pulse (Step #37). When the base end sensor 18 has not been switched on (NO in Step 35), the controller 22 returns to the step #3 for repeating the above-mentioned steps.

Subsequently, a value "24" (24×0.125 µs=3.0 µs) is set to the second memory 153 as the set value $T_N$ for setting the period of the charging time period (Step #39). After that, the driving pulse generator 145 starts to output the driving pulses (Step #41). Simultaneously, the timer 36 starts to count a time corresponding to the movement of the driven member 30 (Step #43). The controller 22 judges whether the top end sensor 20 is switched on or not (Step #45). When the top end sensor 20 has not been switched on, the controller 22 judges whether a predetermined time, for example, 10 ms has passed or not (Step #47). When the predetermined time has passed, the controller 22 further judges whether the displacement or moving quantity of the driven member 30 is larger than a first predetermined distance, for example, 24 µm or not (Step #49).

When the top end sensor 20 is switched on (YES in the step #45), the controller 22 stops outputting the driving pulses (Step #51). The controller 22 returns to the step #1 to repeat the above-mentioned steps. When the predetermined time has not been passed (NO in the step #47), the controller 22 returns to the step #45 to repeat the steps #45 and #47. The judgement of time passing in the step #47 is based on the output of the timer 36. The judgement of displacement of the driven member 30 in the step #49 is based on the output of the position sensor 16. Concretely, the driven member 30 is moved under the condition of the driving period of 14.5 µs and the charging time period of 3.0 µs until the predetermined time, for example, 10 ms has passed. When the driven member 30 has reached to the top end of the driving member 28 until the predetermined time has passed, the driven member 30 cannot be moved further, so that the outputting of the driving pulse is stopped.

When the displacement of the driven member 30 is not larger than the first predetermined distance, the controller 22 further judges whether the displacement of the driven member 30 is smaller than the second predetermined distance (22 µm) or not (Step #53). When the displacement of the driven member 30 is equal to or larger than the second predetermined distance (NO in the step #53), the controller 22 returns to the step #43 so as to repeat the above-mentioned steps. Concretely, when the driven member 30 remains in a predetermined region (for example, 22 µm to 24 µm) after passing the predetermined time (for example, 10 ms), the driven member 30 is moved under the condition of the driving period of 14.5 µs and the charging time period of 3.0 µs.

When the displacement of the driving member 30 is larger than the first predetermined distance (YES in the step #49), a value "1" corresponding to 0.125 µs is subtracted from the set value $T_N$ of the second memory 153 (Step #55). Subsequently, the controller 22 judges whether the set number $T_N$ of the second memory 153 is smaller than 20 or not (Step #57). When the set value $T_N$ is smaller than 20, the controller 22 stops outputting the driving pulses (Step #59) and displays the alarm message on the monitor display (Step #61). Furthermore, the controller 22 stops the operation from moving the piezoelectric actuator 10. Concretely, when the displacement of the driven member 30 is smaller than the first predetermined distance (for example, 24 µm), the charging time period is gradually decreased from 3.0 µs, so that the moving speed of the driven member 30 is gradually decreased. Furthermore, when the driven member 30 has not been reached to the position of the top end sensor 20 until the charging time period becomes equal to or larger than 2.5 µs, the controller 22 judges that a trouble occurs in the piezoelectric actuator 10. The controller 22 stops outputting the driving signals and outputs the alarm, simultaneously.

When the displacement of the driven member 30 is smaller than the second predetermined time, for example, 22 µs (YES in Step #53), a value "1" corresponding to 0.125 µs is added to the set value $T_N$ of the second memory 153 (Step #63). Subsequently, the controller 22 judges whether the set number $T_N$ of the second memory 153 is larger than 28 or not (Step #65). When the set value $T_N$ is larger than 28, the controller 22 stops outputting the driving signals (Step #59). Alternatively, when the set value $T_N$ is equal to or smaller than 28, the controller 22 returns to the step #43 so as to repeat the above-mentioned steps. Concretely, when the displacement of the driven member 30 is smaller than the second predetermined distance (for example, 22 µm) after passing a predetermined time (for example, 10 ms), the charging time period is gradually increased from 3.0 µs, so that the moving speed of the driven member 30 is gradually increased. Furthermore, when the driven member 30 has not been reached to the position of the top end sensor 20 until the charging time period becomes equal to or larger than 3.5 µs, the controller 22 judges that a trouble occurs in the piezoelectric actuator 10. The controller 22 stops outputting the driving signals and outputs the alarm, simultaneously.

A modified driving circuit 14 is shown in FIG. 14A. In comparison with FIG. 14A and FIG. 4, the modified driving circuit 14 shown in FIG. 14A is different that a resistor R is connected between the connection point "b" and the ground from the basic driving circuit 14 shown in FIG. 4. Waveforms of the driving voltage applied to the piezoelectric device 26, the driving pulses and ON and OFF of the switching elements Q1 to Q4 of the modified driving circuit 14 are shown in FIG. 15. As can be seen from FIG. 15, the waveform of the driving voltage applied to the piezoelectric device 26 becomes gentle in comparison with FIG. 7. The operation of the modified driving circuit 14, however, is essentially the same as that of the basic driving circuit shown in FIG. 4.

Figure 14C:
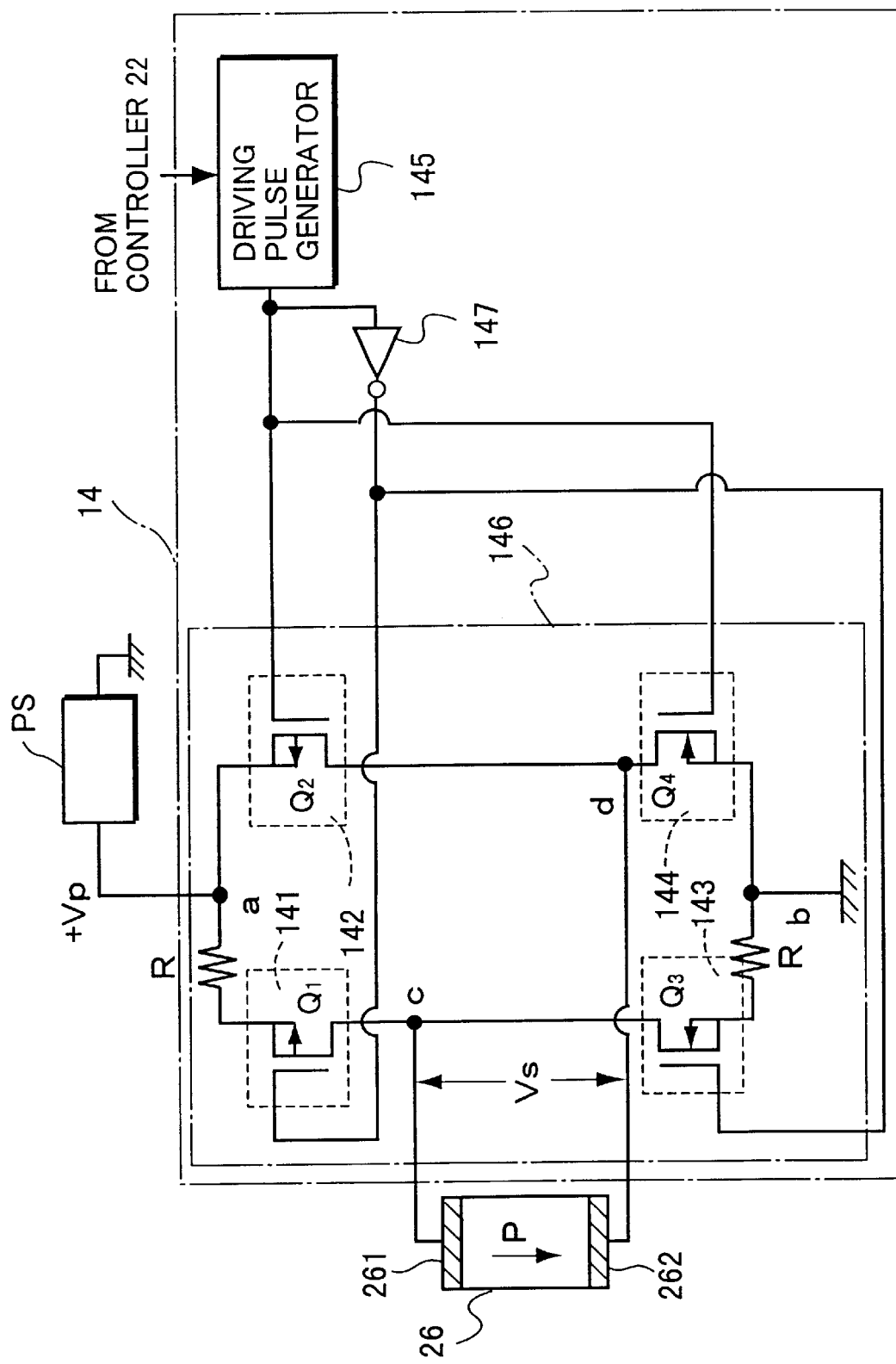

The resistor R is connected between the connection point "b" and the ground in the modification shown in FIG. 14A. It, however, is possible to connect one or two resistor(s) R to one or both of the switching elements Q1 and Q4, and to connect one or two resistor(s) R to one or both of the switching elements Q2 and Q3. Concretely, the following variations can be admitted. Two resistors R respectively are connected between: (1) the connection point "a" and the switching circuit Q1 and the connection point "a" the switching element Q2 (see FIG. 14B); (2) the connection point "a" and the switching circuit Q1 and the connection point "b" the switching element Q3 (see FIG. 14C); (3) the connection point "b" and the switching circuit Q4 and the connection point "a" the switching element Q2; or (4) the connection point "b" and the switching circuit Q4 and the connection point "b" the switching element Q3. (5) Four resistors R are respectively connected between the connection point "a" and the switching elements Q1 and Q2 and the connection point "b" and the switching elements Q3 and Q4 (see FIG. 14D).

In these variations, the waveform of the driving voltage becomes gentle similar to the case shown in FIG. 14A. The operation of the these variations of the driving circuit 14, however, is essentially the same as that of the basic driving circuit shown in FIG. 4.

Figure 14E:
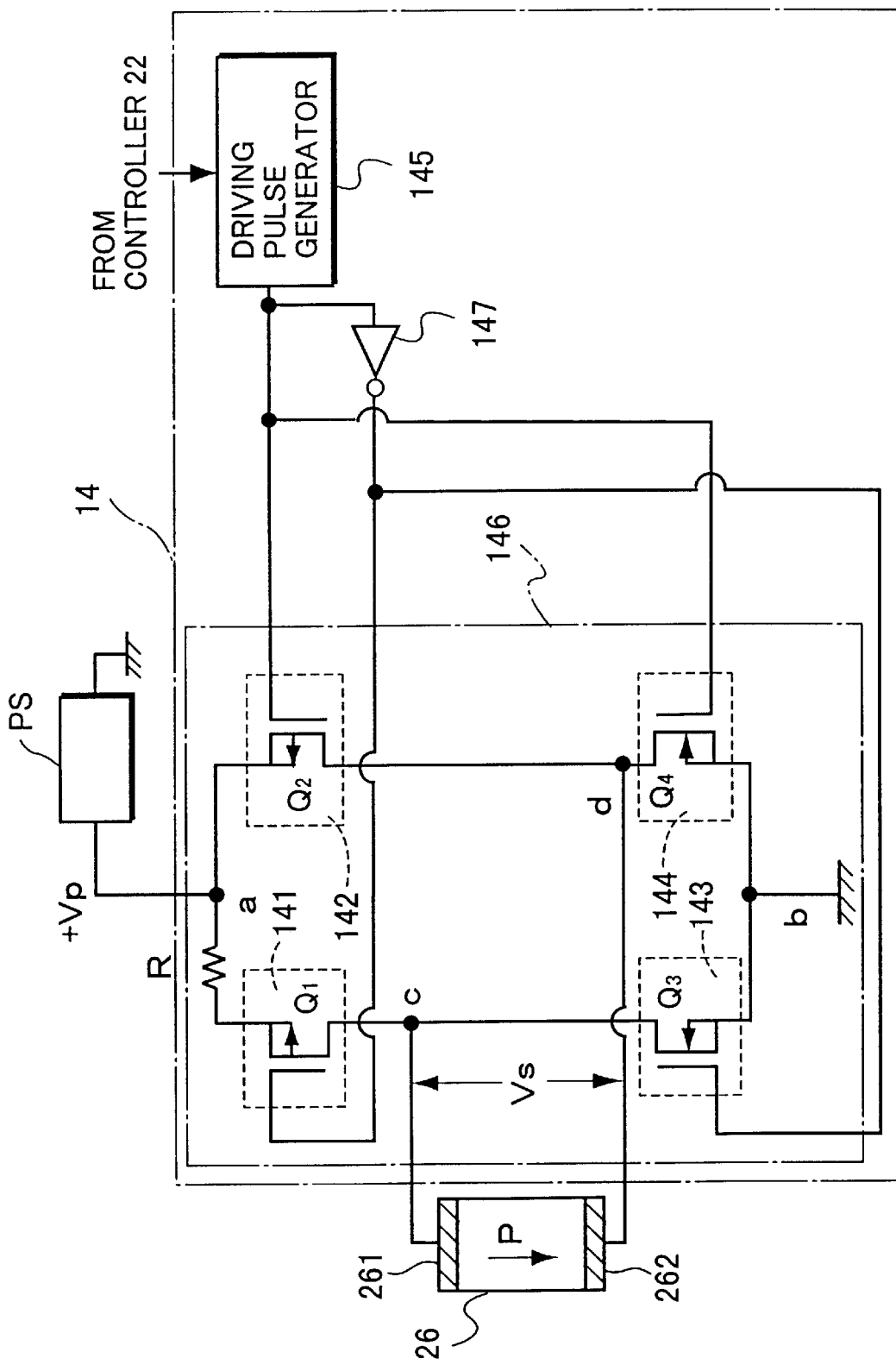
Figure 14F:
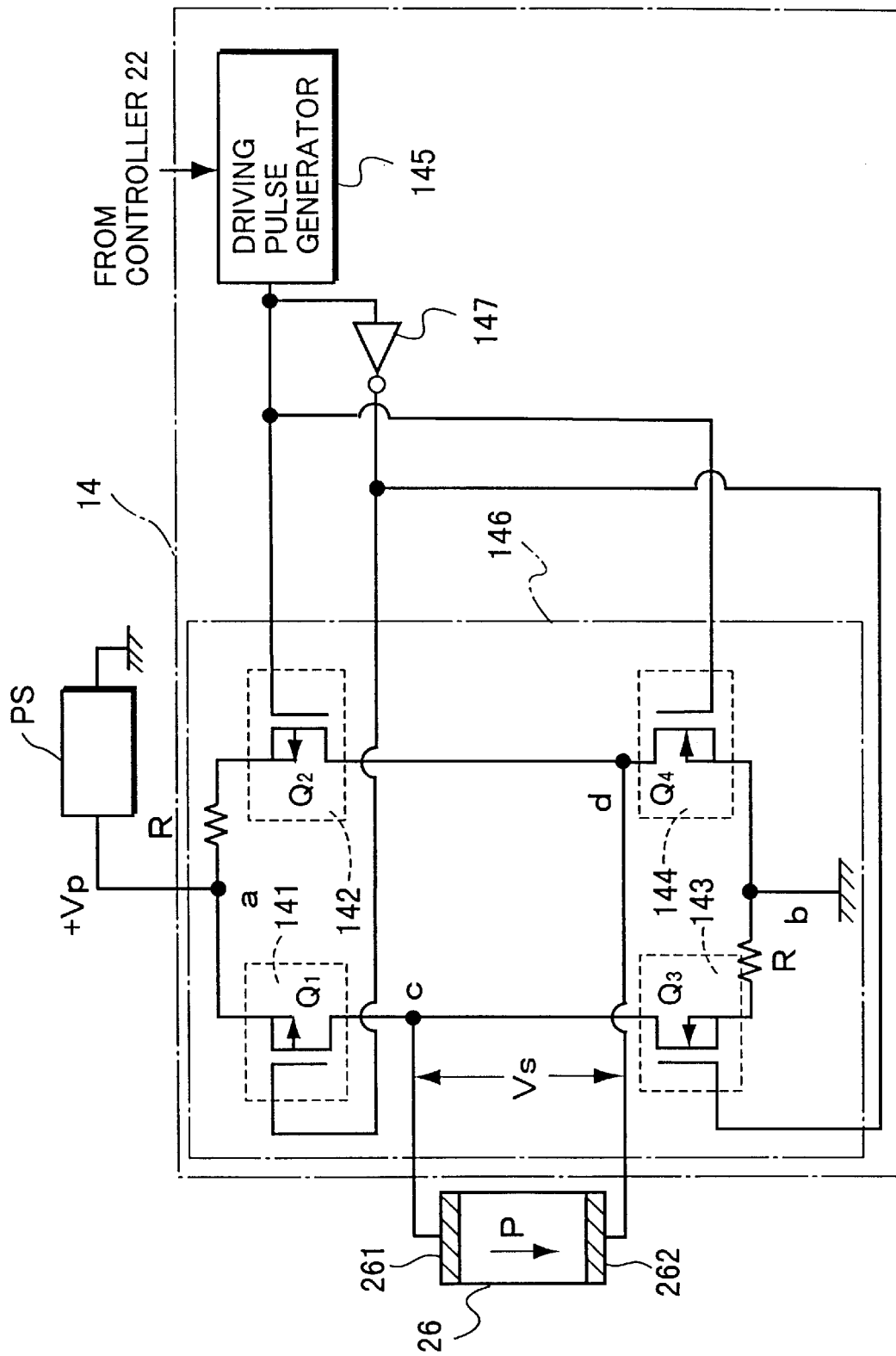

Furthermore, it is possible to connect one or two resistor(s) R to one or both of the switching elements Q1 and Q4, or to connect one or two resistor(s) R to one or both of the switching elements Q2 and Q3. Concretely, the following variations can be admitted. Only one resistor R is connected between: (6) the connection point "a" and the switching circuit Q1 (see FIG. 14E); (7) the connection point "b" and the switching element Q3; (8) the connection point "a" and the switching element Q2; and (9) the connection point "b" and the switching circuit Q4. Two resistors R are connected between: (10) the connection point "a" and the switching element Q1 and the connection point "b" and the switching element Q4; or (11) the connection point "a" and the switching element Q2 and the connection point "b" and the switching element Q3 (see FIG. 14F).

When the resistor(s) is (are) serially connected to at least one or both of the switching circuits Q1 and Q4, the waveform of the driving voltage applied to the piezoelectric device 26 becomes gentle in the vicinity of the voltage +Vp. Alternatively, when the resistor(s) is (are) serially connected to at least one or both of the switching circuits Q2 and Q3, the waveform of the driving voltage applied to the piezoelectric device 26 becomes gentle in the vicinity of the voltage −Vp. The operation of the these variations of the driving circuit 14, however, is essentially the same as that of the basic driving circuit shown in FIG. 4.

Figure 16:
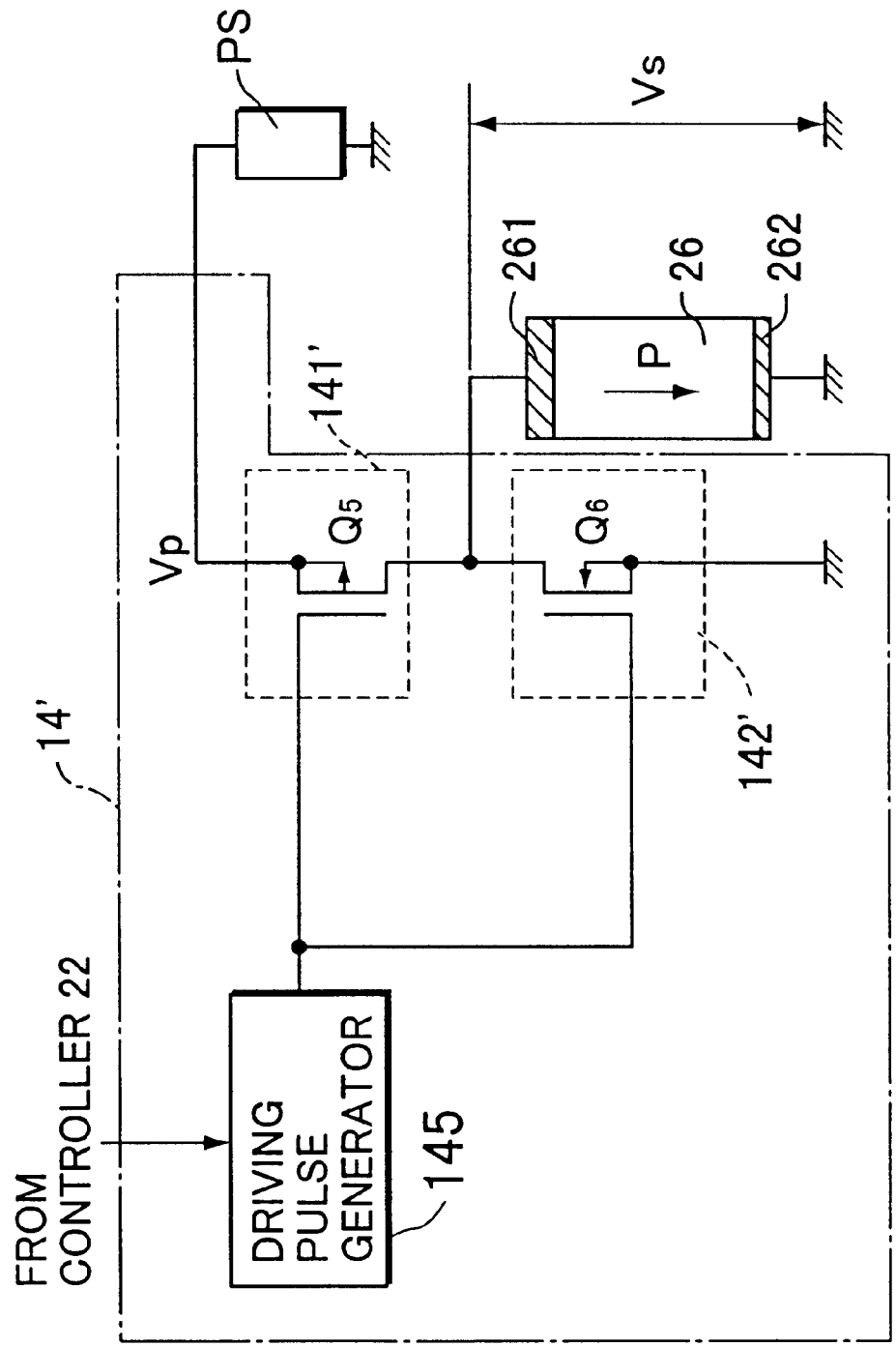
FIG. 16 is a circuit diagram for showing still another modification of the driving circuit in the embodiment.

Another modified driving circuit 14' is shown in FIG. 16. In the basic driving circuit 14 shown in FIG. 4, the first driving circuit serving as a charging and discharging circuit is configured by the first switching circuit 141 and the fourth switching circuit 144, and the second driving circuit serving as a charging and discharging circuit is configured by the second switching circuit 142 and the third switching circuit 143. On the other hand, in the modified driving circuit 14' shown in FIG. 16, a first driving circuit serving as a charging circuit is configured by only a first switching circuit 141' and a second driving circuit serving as a discharging circuit is configured by only a second switching circuit 142'. The driving pulses are applied to the first switching circuit 141' and the second switching circuit 142' from the driving pulse generator having substantially the same configuration as that shown in FIG. 5. A driving voltage +Vp is applied to the piezoelectric device 26 from the driving power source PS.

The first switching circuit 141' serving as the charging circuit applies the driving voltage Vp to the positive electrode 261 to the piezoelectric device 26 disposed at positive side of the polarization direction shown by arrow P for charging the piezoelectric device 26 in the same direction as the polarization. The first switching circuit 141' is configured by a switching element Q5 of P-channel type MOS-FET connected between the driving power source PS and the electrode 261 of the piezoelectric device 26. The second switching circuit 142' serving as the discharging circuit discharges the electric charge in the piezoelectric device 26 by grounding the electrode 261 of the piezoelectric device 26 (or applying negative potential in the opposite direction to the voltage between the electrode 261 and 262 of the piezoelectric device 26. The second switching circuit 142' is configured by a switching element Q6 of an N-channel type MOS-FET connected between the ground and the electrode 261 of the piezoelectric device 26.

Figure 17:
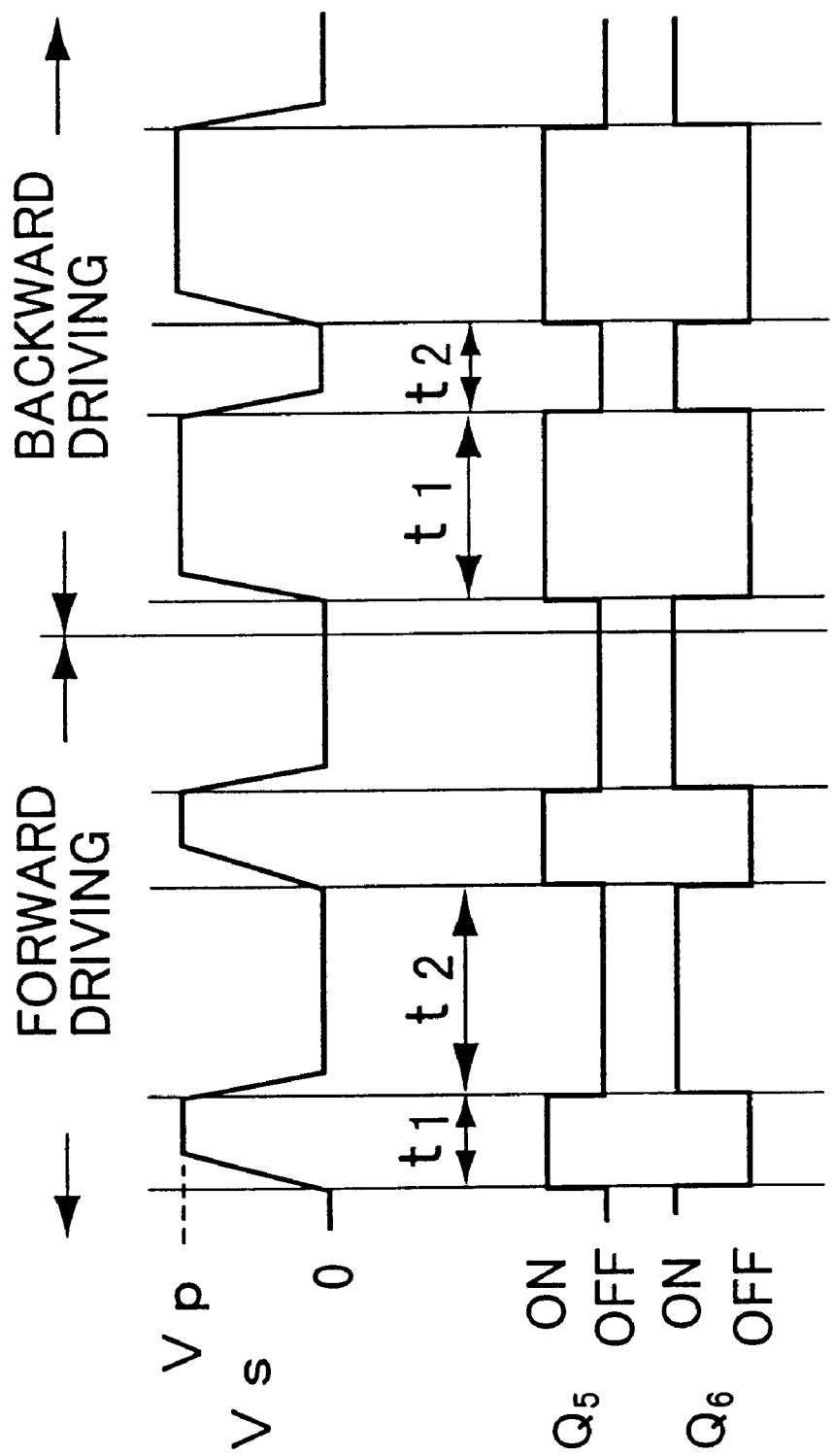
FIG. 17 is a timing chart for showing waveforms of a driving voltage applied to the piezoelectric device and ON and OFF of switching elements Q5 to Q6 in the modified driving circuit shown in FIG. 16.

Waveforms of the driving voltage applied to the piezoelectric device 26 and ON and OFF of the switching elements Q5 to Q6 in the driving circuit 14' shown in FIG. 16 are shown in FIG. 17. As can be seen from FIG. 17, when the switching element Q5 is switched on by applying a driving pulse from the driving pulse generator 145, the switching element Q6 is switched off. The piezoelectric device 26 is charged in the same direction as the polarization by the voltage Vp. Alternatively, when the switching element Q6 is switched on, the switching element Q5 is switched off and the electric charge in the piezoelectric device 26 is discharged.

When the driving circuit 14' shown in FIG. 16 is used as the driving circuit of the piezoelectric actuator 10 in the embodiment, it was confirmed that the piezoelectric actuator 10 operates the forward driving when the duty ratio D of the charging time period t1 and the discharging time period t2 is smaller than 0.5, and operates the backward driving when the duty ratio D is larger than 0.5.

Figure 18:
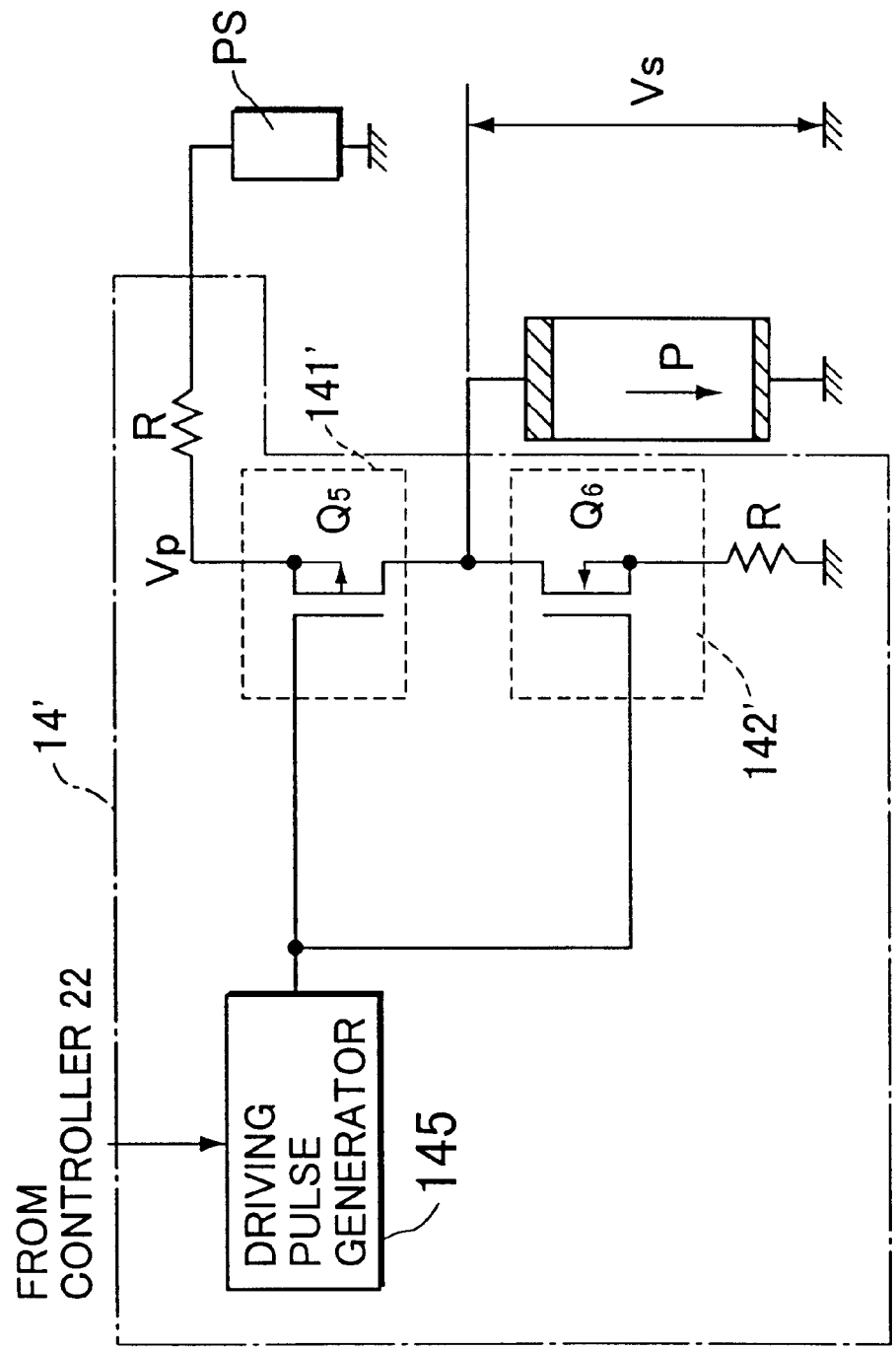
FIG. 18 is a circuit diagram for showing still another modification of the driving circuit in the embodiment.
Figure 19:
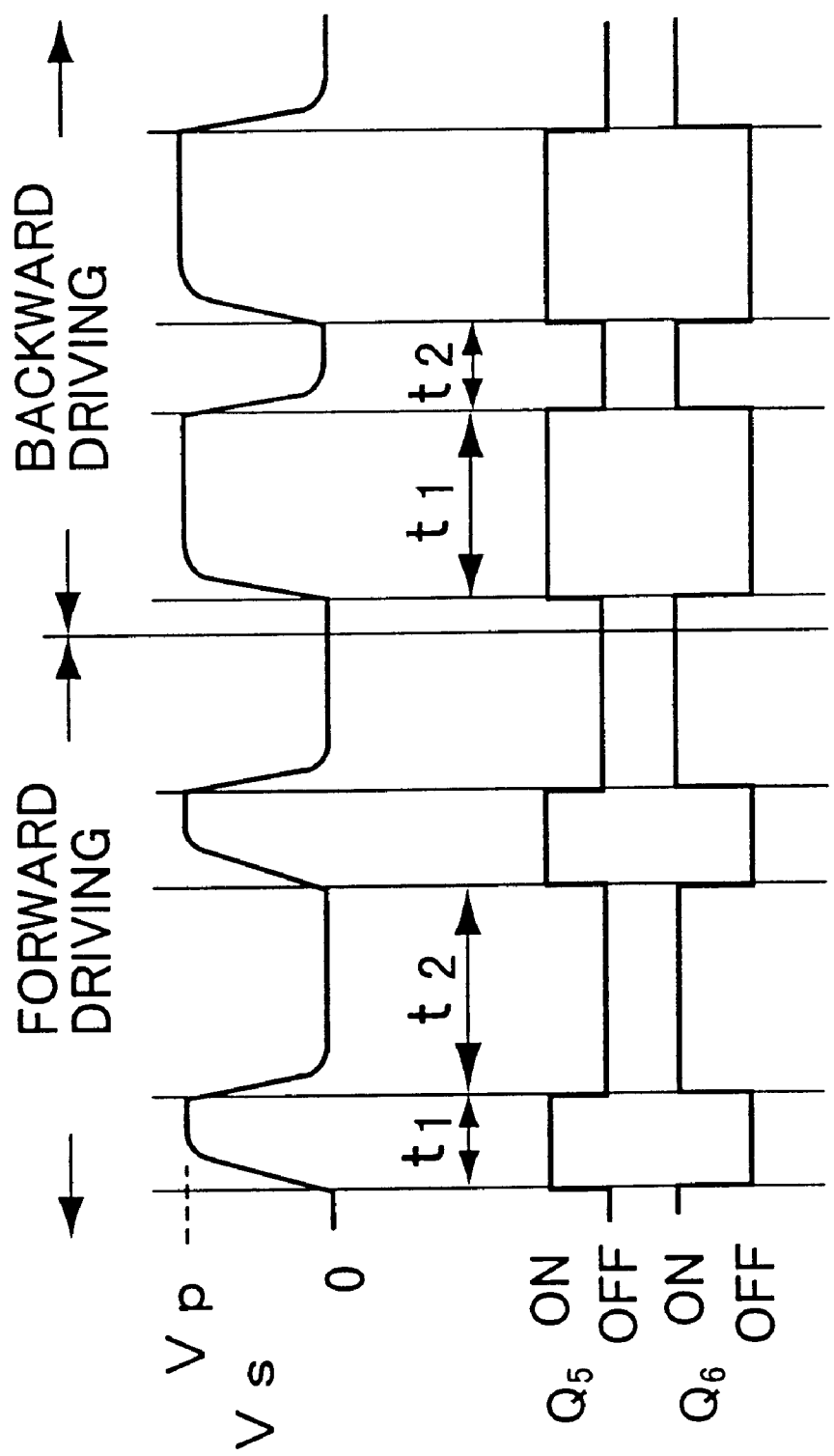
FIG. 19 is a timing chart for showing waveforms of a driving voltage applied to the piezoelectric device and ON and OFF of switching elements Q5 to Q6 in the modified driving circuit shown in FIG. 18.
Figure 20:
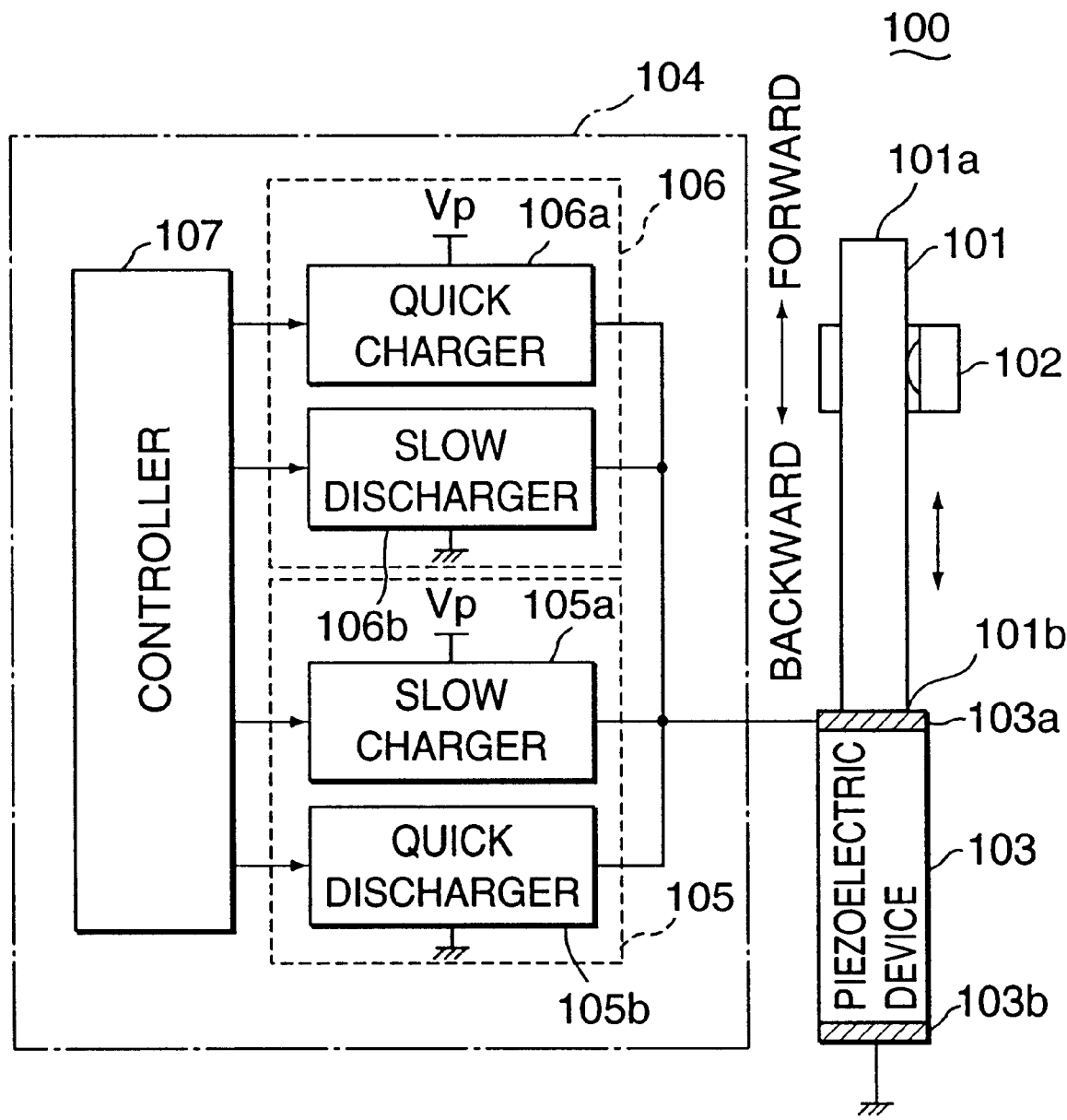
FIG. 20 is a block diagram for showing a basic configuration of a conventional impact type piezoelectric actuator.
Figure 21:
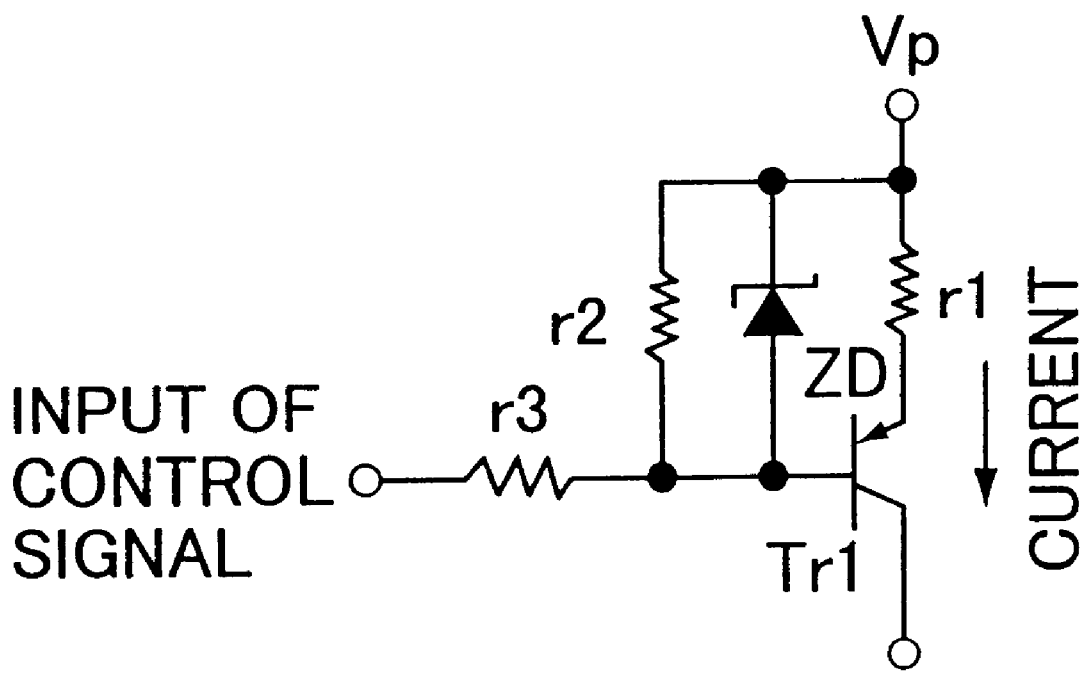
FIG. 21 is a circuit diagram for showing a configuration of a slow charger 105a in FIG. 20.
Figure 22:
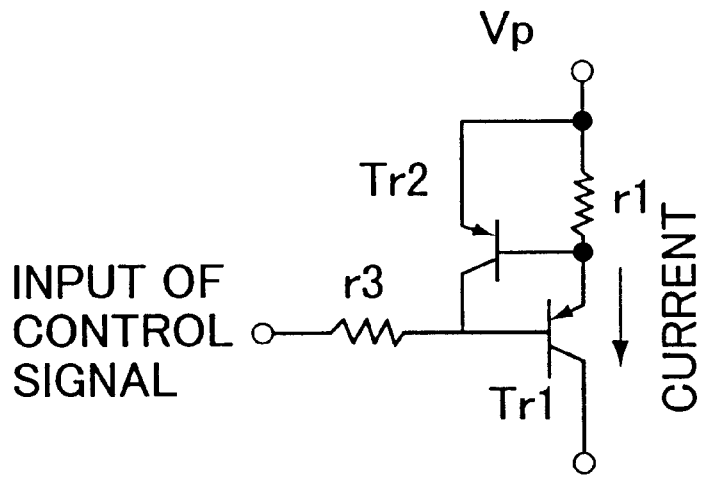
FIG. 22 is a circuit diagram for showing another configuration of the slow charger 105a in FIG. 20.
Figure 23:
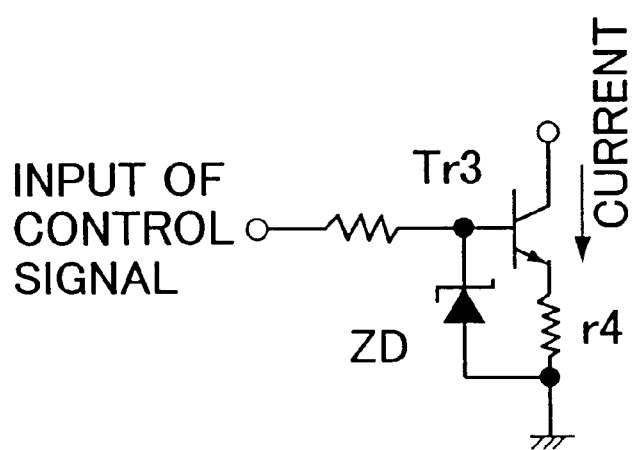
FIG. 23 is a circuit diagram for showing a configuration of a slow discharger 106b in FIG. 20.

Still another modification of the driving circuit 14' is shown in FIG. 18. In comparison with FIG. 16 and FIG. 18, the modified driving circuit 14' shown in FIG. 18 is different in that two resistors R are respectively connected between the switching element Q5 and the driving power source PS and between the switching element Q6 and the ground. Since the resistors R are connected, the waveform of the driving voltage in the vicinity of +Vp in the charging operation and in the vicinity of zero in the discharging operation becomes gentle. The operation of the modified driving circuit 14', however, is essentially the same as that of the driving circuit 14' shown in FIG. 16. Furthermore, it is possible to provide only one resistor R between the switching element Q5 and the driving power source PS or between the switching element Q6 and the ground. In the former case, the waveform of the driving voltage in the vicinity of +Vp in the charging operation becomes gentle. In the latter case, the waveform of the driving voltage in the vicinity of zero in the discharging operation becomes gentle. The operations of both cases, however, are essentially the same as that of the driving circuit 14' shown in FIG. 16.

As mentioned above, the piezoelectric actuator in accordance with the embodiment comprises: a first driving circuit for charging and discharging the piezoelectric device by applying a driving voltage in the same direction as the polarization thereof, a second driving circuit for charging and discharging the piezoelectric device substantially the same charging and discharging speed as those of the first driving circuit by applying the driving voltage in the opposite direction to the polarization; a setting data modifier for modifying at least one of a first driving time period of the first driving circuit and a second driving time period of the second driving circuit; and a driving controller for driving the first driving circuit and the second driving circuit, alternately. Thus, the piezoelectric actuator needs no constant current circuit, so that the driving circuit of the piezoelectric actuator can be made simple and small. Furthermore, the driving circuits are driven by continuous driving pulses, so that the moving speed of the driven member can be changed smoothly. Still furthermore, the piezoelectric actuator can be downsized, so that the manufacturing cost of the piezoelectric actuator becomes inexpensive.

The configuration of the piezoelectric actuator in accordance with this invention is not restricted by the above-mentioned embodiment. The configuration of the driving unit 12 is not restricted by the configuration illustrated in FIGS. 2 and 3. It is possible to have another configuration. Still furthermore, the switching element of the driving circuits 14 and 14' is not restricted by the MOS-FET. It is possible to use another electronic switching elements such as a junction type FET, a bipolar transistor, a GTO (Gate Turn-Off thyristor), or the like can be used.

Still furthermore, with respect to the control of the moving speed of the driven member, the charging time period of the piezoelectric device is changed under a constant driving period. It, however, is possible to control the driving period by changing the charging time period or the discharging time period.

Still furthermore, in the above-mentioned embodiment, the base end of the piezoelectric device is fixed on the holder. It, however, is possible to configure that the piezoelectric device moves relative to the holder. Concretely, the driven member is fixed to the piezoelectric device, and the piezoelectric device is movably coupled to a guide member by a friction mechanism, as shown in FIG. 25 of U.S. Pat. No. 5,786,654.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A piezoelectric actuator comprising:

a piezoelectric device having a first end and a second end in a prescribed direction thereof, said piezoelectric device being capable of displacing in the prescribed direction;

a driving member an end of which is fixed on the first end of the piezoelectric device;

a holder to which the second end of the piezoelectric device is fixed;

a driven member coupled with the driving member by a friction force and movable in the prescribed direction;

a first driver for charging and/or discharging the piezoelectric device by applying a driving voltage in a same direction as a polarization direction of the piezoelectric device;

a second driver for charging and/or discharging the piezoelectric device at substantially the same charging and discharging speed as the first driver by applying the driving voltage in an opposite direction to the polarization direction;

a setting data modifier for modifying at least one of a first driving time period of the first driver and a second driving time period of the second driver; and a driving controller for driving the first driver and the second driver, alternately.

2. A piezoelectric actuator in accordance with claim 1, wherein the first driver is configured by a charging and discharging circuit for charging electric charge to the piezoelectric device in the same direction as the polarization direction and for discharging the electric charge from the piezoelectric device in the opposite direction to the polarization direction; and the second driver is configured by a charging and discharging circuit for charging electric charge to the piezoelectric device in the opposite direction to the polarization direction and for discharging the electric charge from the piezoelectric device in the same direction as the polarization direction.

3. A piezoelectric actuator in accordance with claim 2, wherein the first driver includes a first switch connected between a driving power source and a first electrode of the piezoelectric device and a second switch connected between a second electrode of the piezoelectric device and a ground; and the second driver includes a third switch connected between the driving power source and the second electrode of the piezoelectric device and a fourth switch connected between the first electrode of the piezoelectric device and the ground.

4. A piezoelectric actuator in accordance with claim 1, wherein the first driver is a charging circuit for charging electric charge to the piezoelectric device in the same direction as the polarization direction; and the second driver is a discharging circuit for discharging the electric charge from the piezoelectric device.

5. A piezoelectric actuator in accordance with claim 4, wherein the charging circuit includes a first switch connected between a driving power source and an electrode of the piezoelectric device; and the discharging circuit includes a second switch connected between the electrode of the piezoelectric device and a ground.

6. A piezoelectric actuator in accordance with claim 1, wherein the setting data modifier modifies the first driving time period and the second driving time period so as to make the driving period be constant.

7. A piezoelectric actuator in accordance with claim 1, wherein the setting data modifier modifies the first driving time period or the second driving time period so as to vary the driving period.

8. A driving apparatus used in a piezoelectric actuator that comprises (1) a piezoelectric device having a first end and a second end in a prescribed direction thereof, said piezoelectric device being capable of displacing in the prescribed direction, (2) a driving member an end of which is fixed on the first end of the piezoelectric device, (3) a holder to which the second end of the piezoelectric device is fixed, and (4) a driven member coupled with the driving member by a friction force and movable in the prescribed direction, said driving apparatus comprising:

a first driver for charging and/or discharging the piezoelectric device by applying a driving voltage in a same direction as a polarization direction of the piezoelectric device;

a second driver for charging and/or discharging the piezoelectric device at substantially the same charging and/or discharging speed(s) as the first driver by applying the driving voltage in an opposite direction to the polarization direction;

a setting data modifier for modifying at least one of a first driving time period of the first driver and a second driving time period of the second driver; and a driving controller for driving the first driver and the second driver, alternately.

9. A driving apparatus in accordance with claim 8, wherein the first driver is configured by a charging and discharging circuit for charging electric charge to the piezoelectric device in the same direction as the polarization direction and for discharging the electric charge from the piezoelectric device in the opposite direction to the polarization direction; and the second driver is configured by a charging and discharging circuit for charging electric charge to the piezoelectric device in the opposite direction to the polarization direction and for discharging the electric charge from the piezoelectric device in the same direction as the polarization direction.

10. A driving apparatus in accordance with claim 9, wherein the first driver includes a first switch connected between a driving power source and a first electrode of the piezoelectric device and a second switch connected between a second electrode of the piezoelectric device and a ground; and the second driver includes a third switch connected between the driving power source and the second electrode of the piezoelectric device and a fourth switch connected between the first electrode of the piezoelectric device and the ground.

11. A driving apparatus in accordance with claim 8, wherein the first driver is a charging circuit for charging electric charge to the piezoelectric device in the same direction as the polarization direction; and the second driver is a discharging circuit for discharging the electric charge from the piezoelectric device.

12. A driving apparatus in accordance with claim 8, wherein the charging circuit includes a first switch connected between a driving power source and an electrode of the piezoelectric device, and the discharging circuit includes a second switch connected between the electrode of the piezoelectric device and a ground.

13. A driving apparatus in accordance with claim 8, wherein the setting data modifier modifies the first driving time period and the second driving time period so as to make the driving period be constant.

14. A driving apparatus in accordance with claim 8, wherein the setting data modifier modifies the first driving time period or the second driving time period so as to vary the driving period.

15. A piezoelectric actuator comprising:

a piezoelectric device having a piezoelectric member and a pair of electrodes, said piezoelectric device capable of being displaced in a displacement direction in response to an applied voltage from said pair of electrodes and having first and second ends with respect to the displacement direction;

a driving member fixed to said first end of the piezoelectric device;

a holder fixed to said second end of the piezoelectric device;

a driven member frictionally coupled with the driving member and being movable in the displacement direction;

a driver, connected to said pair of electrodes, for applying a voltage pulse stream of first and second phases, each of the first phases being for applying a driving voltage to said piezoelectric device in a first direction parallel to a polarization direction so as to at least charge said piezoelectric device at a first charging speed, and each of second phases being for applying the driving voltage to said piezoelectric device in a second direction that is an opposite direction of the first direction so as to at least discharge said piezoelectric device at a first discharge speed that is substantially the same as the first charging speed; and a driver controller for setting a duty ratio of the first and second phases of the voltage pulse stream.

16. A piezoelectric actuator in accordance with claim 15, wherein, in each of the first phases, said piezoelectric device is discharged at a second discharging speed and is further charged at the first charging speed, and wherein, in each of the second phases, said piezoelectric device is discharged at the first discharging speed and is further charged at a second charging speed.

17. A piezoelectric actuator in accordance with claim 15, wherein a moving direction of the driven member is controlled by changing the duty ratio of the first and second phases of the voltage pulse stream.

18. A piezoelectric actuator in accordance with claim 15, wherein a moving speed of the driven member is controlled by changing the duty ratio of the first and second phases of the voltage pulse stream.

19. A piezoelectric actuator in accordance with claim 18, wherein said controller is capable of controlling the duty ratio in multiple steps.

20. A piezoelectric actuator in accordance with claim 15, wherein said driver comprises an H bridge circuit.

* * * * *